US012633828B2

(12) United States Patent
Higaki et al.

(10) Patent No.: US 12,633,828 B2
(45) Date of Patent: May 19, 2026

(54) POWER CONVERTER APPARATUS AND MAIN CIRCUIT POWER FEEDER DEVICE

(71) Applicant: Mitsubishi Electric Corporation, Tokyo (JP)

(72) Inventors: Yusuke Higaki, Tokyo (JP); Takushi Jimichi, Tokyo (JP); Takuya Kajiyama, Tokyo (JP); Akito Nakayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 244 days.

(21) Appl. No.: 18/290,013

(22) PCT Filed: May 17, 2021

(86) PCT No.: PCT/JP2021/018544
§ 371 (c)(1),
(2) Date: Nov. 9, 2023

(87) PCT Pub. No.: WO2022/244036
PCT Pub. Date: Nov. 24, 2022

(65) Prior Publication Data
US 2024/0243663 A1      Jul. 18, 2024

(51) Int. Cl.
*H02M 1/32*          (2007.01)
*H02M 1/00*          (2006.01)
(Continued)

(52) U.S. Cl.
CPC ......... *H02M 3/158* (2013.01); *H02M 1/0006* (2021.05); *H02M 1/08* (2013.01); *H02M 1/32* (2013.01)

(58) Field of Classification Search
CPC ............ H02M 1/08; H02M 1/36; H02M 1/32; H02M 1/0006; H02M 3/158; H02M 3/1582; H02M 7/4833; H02M 7/4835
See application file for complete search history.

(56) References Cited

U.S. PATENT DOCUMENTS

2016/0141965 A1      5/2016  Hasegawa et al.
2018/0006551 A1 *    1/2018  Park .................... H02M 7/4835
(Continued)

FOREIGN PATENT DOCUMENTS

CN      120185358 A  *  6/2025
EP      3 242 389 A1     11/2017
(Continued)

OTHER PUBLICATIONS

International Search Report and Written Opinion mailed on Jun. 29, 2021, received for PCT Application PCT/JP2021/018544, filed on May 17, 2021, 8 pages including English Translation.
(Continued)

*Primary Examiner* — Jue Zhang
*Assistant Examiner* — Jye-June Lee
(74) *Attorney, Agent, or Firm* — XSENSUS LLP

(57) ABSTRACT

A main circuit power feeder device for supplying control power from a main circuit power storage element to a main circuit control device includes: a plurality of voltage-division power storage elements connected in series; a voltage adjustment circuitry which is connected to the voltage-division power storage elements and adjusts voltages of the voltage-division power storage elements by mutual transfer of power among the voltage-division power storage elements; and a control circuitry which outputs control command values in two patterns that are a voltage-division control command value for dividing voltage of the main circuit power storage element among the voltage-division power storage elements and a bypass control command value for bypassing at least one voltage-division power storage element, in order to control the voltage adjustment circuitry, and which adjusts input voltage to the DC/DC converter.

20 Claims, 26 Drawing Sheets

(51) Int. Cl.
    *H02M 1/08*     (2006.01)
    *H02M 3/158*     (2006.01)

(56)             References Cited

U.S. PATENT DOCUMENTS

| | | | |
|---|---|---|---|
| 2020/0007028 A1 * | 1/2020 | Hong ................. | H02M 7/4835 |
| 2022/0239231 A1 * | 7/2022 | Nakayama .......... | H02M 7/4835 |

FOREIGN PATENT DOCUMENTS

| | | | | | |
|---|---|---|---|---|---|
| EP | 3 432 456 A1 | | 1/2019 | | |
| EP | 3 813 239 A1 | | 4/2021 | | |
| JP | 2004023834 A | * | 1/2004 | | |
| JP | 2008-187817 A | | 8/2008 | | |
| JP | 5378274 B2 | * | 12/2013 | .......... | H02M 7/4835 |
| JP | 2015-019537 A | | 1/2015 | | |
| JP | 2016-119731 A | | 6/2016 | | |
| JP | 6667747 B1 | | 3/2020 | | |
| WO | 2021/001888 A1 | | 1/2021 | | |

OTHER PUBLICATIONS

Extended European Search Report received for European Patent Application No. 21940657.6, mailed on Jun. 4, 2024, 9 pages.

* cited by examiner

FIG. 12

INPUT

OUTPUT

INDUCTANCE

9

LOAD
RESISTANCE

CAPACITANCE

VOLTAGE DETECTION VALUE

DETERMINATION THRESHOLD

POWER CONVERTER APPARATUS AND MAIN CIRCUIT POWER FEEDER DEVICE

CROSS-REFERENCE TO RELATED APPLICATION

This application is based on PCT filing PCT/JP2021/018544, filed May 17, 2021, the entire contents of which are incorporated herein by reference.

TECHNICAL FIELD

The present disclosure relates to a power conversion apparatus and a main circuit power feeder device.

BACKGROUND ART

In a grid power conversion device or a DC distribution power conversion device, there is a main circuit power feeding system as a system for supplying power to a control device present at a high-potential part in the device. In the main circuit power feeding system, since a circuit for supplying power to the control device is provided at the high-potential part, there is an advantage that dielectric withstand voltage needed for the power feeding circuit can be significantly reduced.

As a circuit for feeding power from a main circuit having high voltage to a gate driving power supply, a circuit in which inputs of the DC/DC converter are connected in series and outputs thereof are connected in parallel is disclosed (for example, Patent Document 1).

In addition, there is a circuit in which, by capacitors connected in series and voltage adjustment circuitries connected in parallel thereto, capacitor voltages are controlled so as not to be overvoltage, and power is supplied to a gate driving power supply from one of the capacitors connected in series, using a DC/DC converter (for example, Patent Document 2).

PRIOR ART DOCUMENT

Patent Document

Patent Document 1: Japanese Laid-Open Patent Publication No. 2015-19537
Patent Document 2: Japanese Patent No. 6667747

SUMMARY OF THE INVENTION

Problem to be Solved by the Invention

In the circuit disclosed in Patent Document 1, the input side and the output side of the DC/DC converter have different potentials and it is required to insulate by using a transformer, so that the power feeding circuit might be increased in size.

In the circuit disclosed in Patent Document 2, voltages of the series capacitors are controlled by a plurality of voltage adjustment circuitries, and when input voltage is reduced, DC capacitor voltage is controlled such that switching pattern is changed by using a voltage control circuit and a voltage detection circuit. In this method, for example, means such as proportional integral control is required as the voltage control circuit for changing the switching pattern, so that the control circuit is complicated.

The present disclosure has been made to solve the above problem, and an object of the present disclosure is to provide a main circuit power feeder device and a power conversion device including the same, which enable size reduction and simplification of control.

Means to Solve the Problem

A power conversion device according to the present disclosure has a main circuit including main circuit switching elements and a main circuit power storage element, a main circuit control device which controls the main circuit switching element, and a main circuit power feeder device which supplies control power from the main circuit power storage element to the main circuit control device. The main circuit power feeder device includes a plurality of voltage-division power storage elements connected in series, a voltage adjustment circuitry which is connected to the plurality of voltage-division power storage elements and adjusts each of voltages of the plurality of voltage-division power storage elements by mutual transfer of power among the plurality of voltage-division power storage elements, at least one DC/DC converter which is connected to at least one of the plurality of voltage-division power storage elements and supplies the control power to the main circuit control device, and a control circuitry which outputs control command values in two patterns that are a voltage-division control command value for dividing voltage of the main circuit power storage element among the plurality of voltage-division power storage elements and a bypass control command value for bypassing at least one of the plurality of voltage-division power storage elements, in order to control the voltage adjustment circuitry, and which adjusts input voltage to the DC/DC converter.

A main circuit power feeder device according to the present disclosure is provided in a power conversion device that includes a main circuit including main circuit switching elements and a main circuit power storage element, and a main circuit control device which controls the main circuit switching elements, the main circuit power feeder device being configured to supply control power from the main circuit power storage element to the main circuit control device, the main circuit power feeder device includes a plurality of voltage-division power storage elements connected in series, a voltage adjustment circuitry which is connected to the plurality of voltage-division power storage elements and adjusts each of voltages of the plurality of voltage-division power storage elements by mutual transfer of power among the plurality of voltage-division power storage elements, at least one DC/DC converter which is connected to at least one of the plurality of voltage-division power storage elements and supplies the control power to the main circuit control device, and a control circuitry which outputs control command values in two patterns that are a voltage-division control command value for dividing voltage of the main circuit power storage element among the plurality of voltage-division power storage elements and a bypass control command value for bypassing at least one of the plurality of voltage-division power storage elements, in order to control the voltage adjustment circuitry, and which adjusts input voltage to the DC/DC converter.

Effect of the Invention

The power conversion device according to the present disclosure makes it possible to reduce the size of the main circuit power feeder device and can control the main circuit power feeder device by a simple control device.

BRIEF DESCRIPTION OF THE DRAWINGS

FIG. 12 is a configuration diagram showing the power conversion device according to embodiment 1.

FIG. 24 is a configuration diagram showing a control circuitry in the power conversion device according to embodiment 4.

EMBODIMENTS FOR CARRYING OUT THE INVENTION

Embodiment 1

Figure 1:
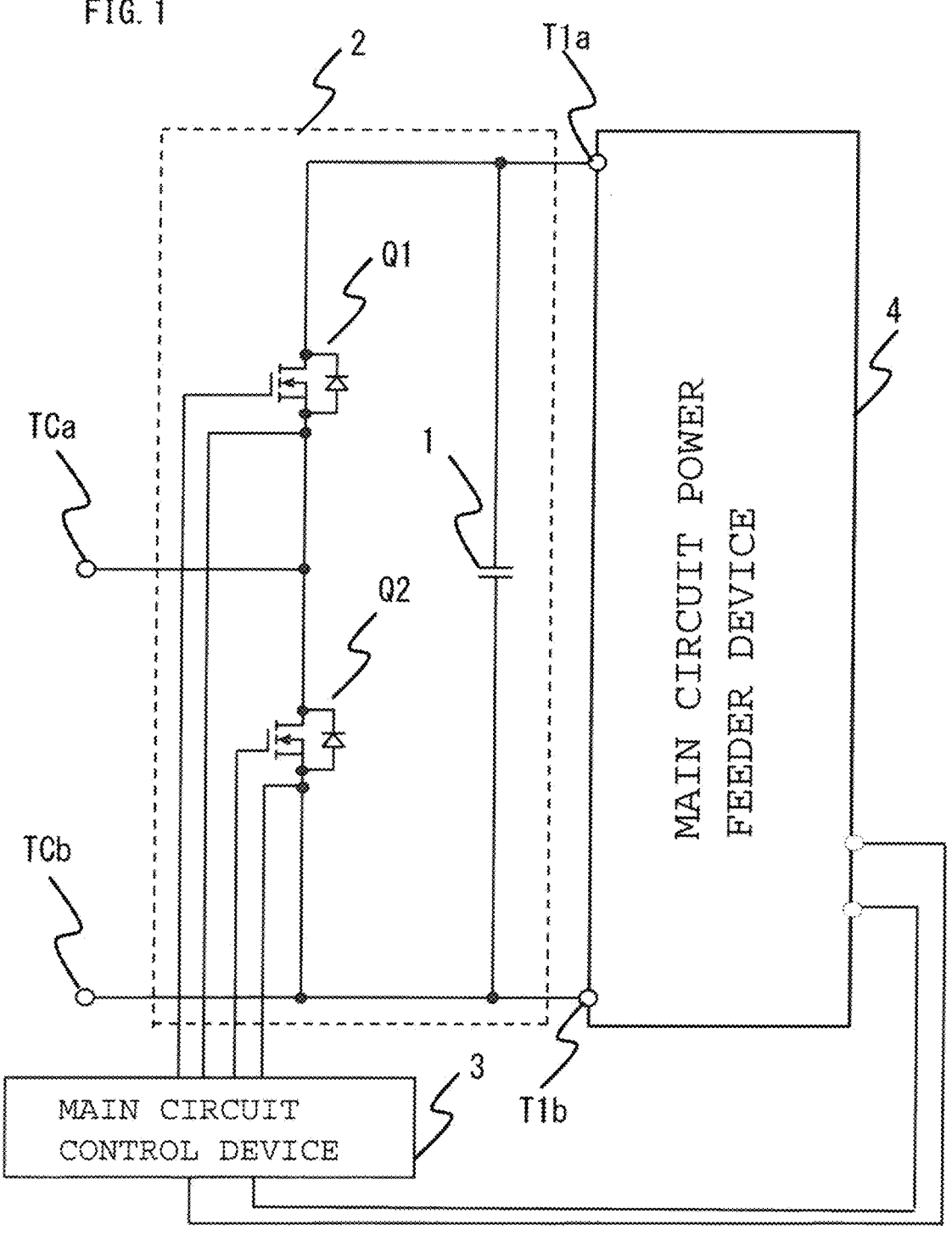
FIG. 1 is a configuration diagram showing a power conversion device according to embodiment 1.
Figure 2:
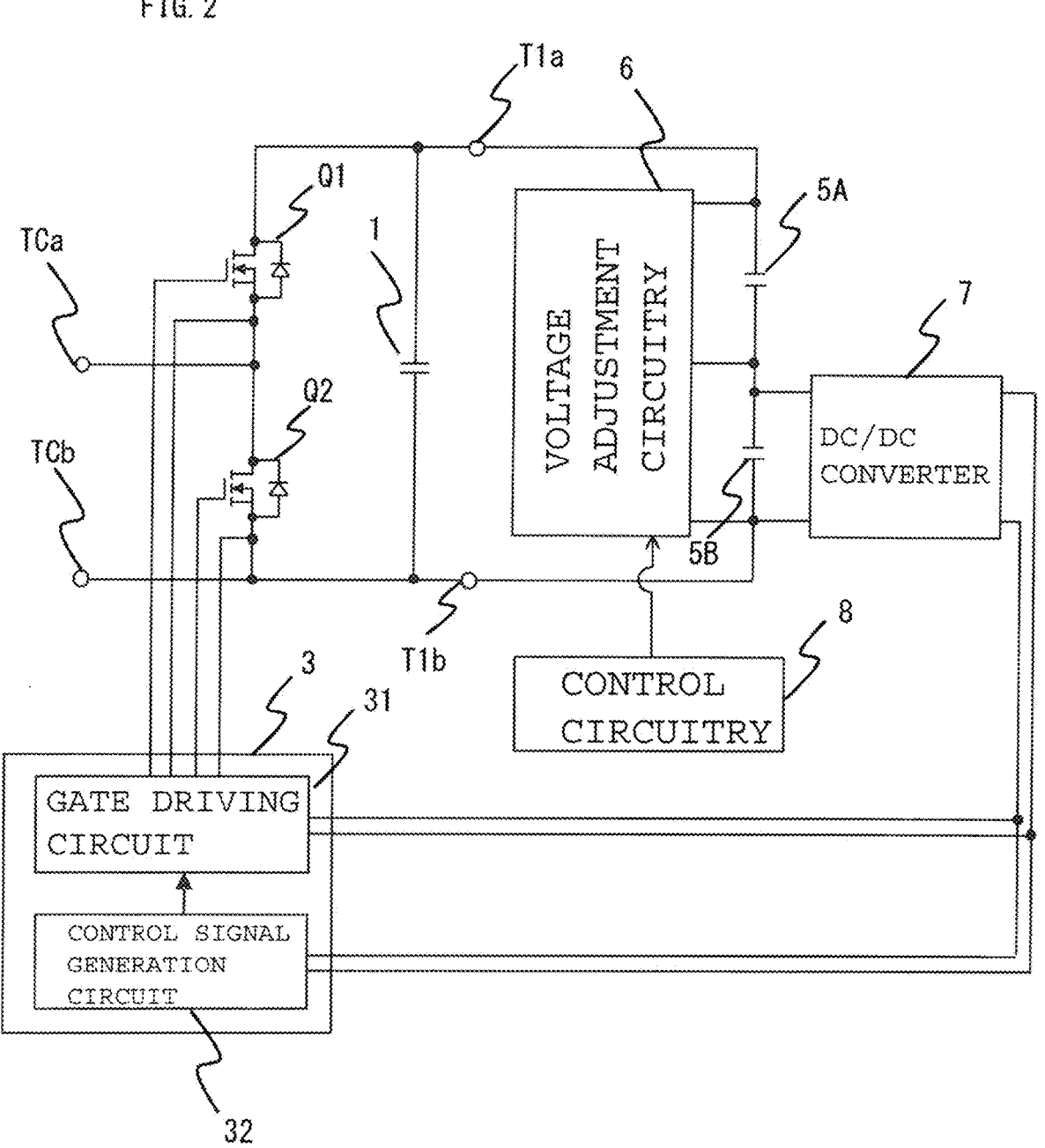
FIG. 2 is a configuration diagram showing the power conversion device according to embodiment 1.

The present disclosure relates to a field of power electronics. FIG. 1 and FIG. 2 are configuration diagrams showing a power conversion device according to embodiment 1. The power conversion device according to embodiment 1 includes a main circuit 2, a main circuit control device 3, and a main circuit power feeder device 4. The main circuit 2 is composed of main circuit switching elements Q1, Q2 and a main circuit power storage element 1. The main circuit control device 3 controls the main circuit switching elements Q1, Q2. The main circuit power feeder device 4 supplies control power from the main circuit power storage element 1 to the main circuit control device 3.

As shown in FIG. 2, the main circuit power feeder device 4 includes a plurality of voltage-division power storage elements 5A, 5B connected in series, a voltage adjustment circuitry 6, one or more DC/DC converters 7, and a control circuitry 8. The voltage adjustment circuitry 6 is connected to the plurality of voltage-division power storage elements 5A, 5B, and adjusts each of voltages of the plurality of voltage-division power storage elements 5A, 5B by mutual transfer of power among the plurality of voltage-division power storage elements 5A, 5B. The DC/DC converter 7 is connected to one voltage-division power storage element 5B of the plurality of voltage-division power storage elements 5A, 5B, and supplies control power. The control circuitry 8 outputs control command values in two patterns in order to control the voltage adjustment circuitry 6.

Figure 3:
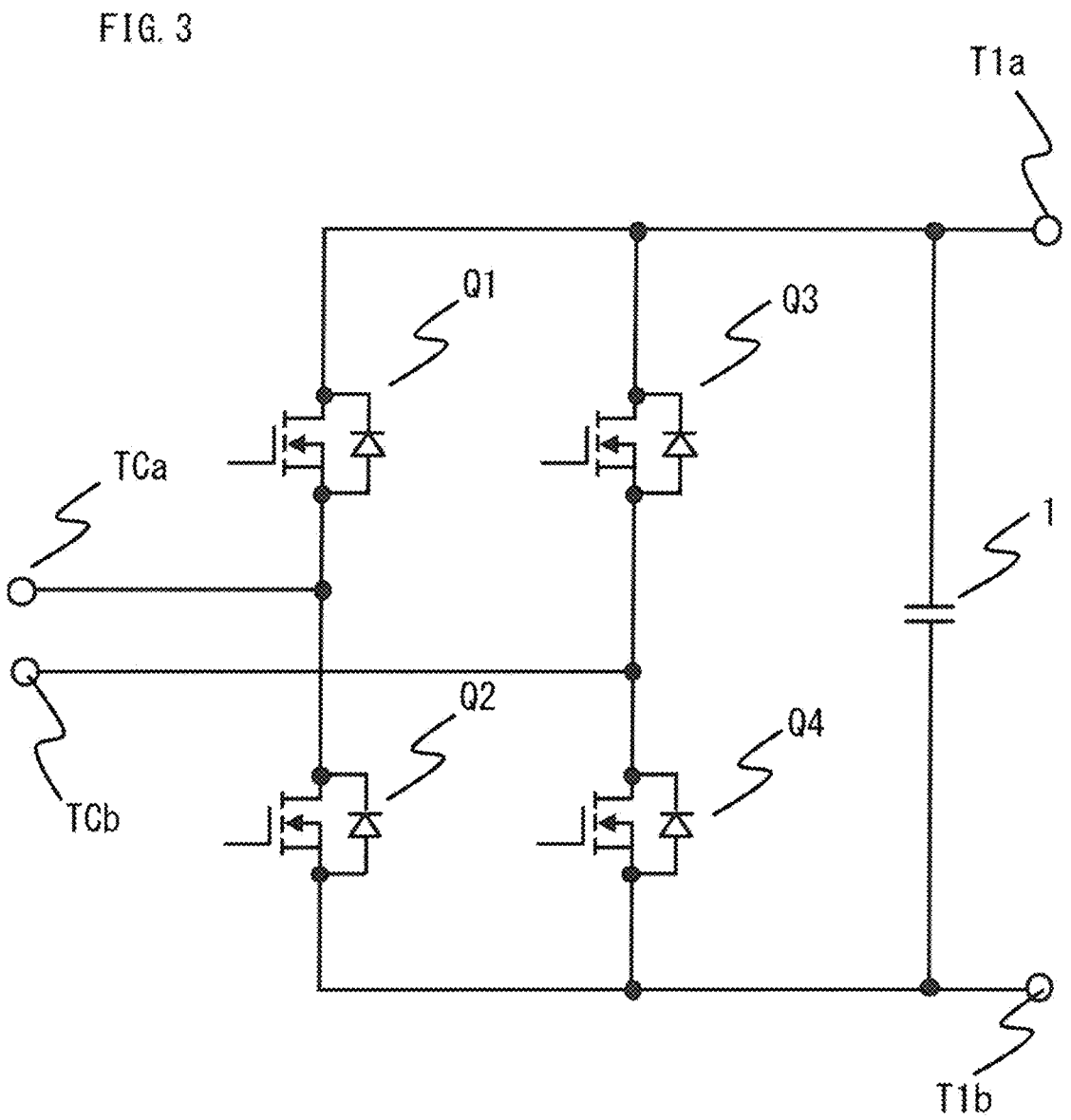
FIG. 3 is a circuit diagram showing a main circuit configured as a full-bridge circuit.

The power conversion device includes the main circuit 2 composed of the main circuit power storage element 1 and the main circuit switching elements Q1, Q2, the main circuit control device 3 which performs driving control of the main circuit switching elements Q1, Q2, and the main circuit power feeder device 4 which supplies power from the main circuit power storage element 1 to the main circuit control device 3. The main circuit 2 shown in FIG. 1 is a so-called half-bridge circuit, and a different main circuit configuration is shown in FIG. 3. The main circuit shown in FIG. 3 is a so-called full-bridge circuit. The main circuit shown in FIG. 1 or FIG. 3 is one unit converter used in a modular multilevel converter (MMC). The configuration of the unit converter may be a half-bridge cell shown in FIG. 1 or may be a full-bridge cell including main circuit switching elements Q1, Q2, Q3, Q4 shown in FIG. 3. The main circuit 2 has terminals TCa, TCb to be connected to another unit converter. The main circuit 2 may have any circuit configuration without being limited to a specific purpose of usage, as long as the main circuit 2 includes the main circuit power storage element 1 and power conversion is performed with respect to voltage and energy of the main circuit power storage element 1 by use of the main circuit switching elements Q1, etc. In this regard, the number of main circuit switching elements, and the types and the number of other elements, are not limited.

The main circuit power feeder device 4 is configured so as to supply power from the main circuit power storage element 1 to the main circuit control device 3. The main circuit control device 3 includes a gate driving circuit 31 and a control signal generation circuit 32. The gate driving circuit 31 drives the main circuit switching elements Q1, Q2, and the control signal generation circuit 32 supplies driving signals to the gate driving circuit 31. The main circuit control device 3, which includes the gate driving circuit 31 and the control signal generation circuit 32, is merely one example of a device for driving the main circuit switching elements Q1, Q2, and is not limited to the above configuration.

As shown in FIG. 2, the main circuit power feeder device 4 includes the plurality of voltage-division power storage elements 5A, 5B connected in series, the voltage adjustment circuitry 6 connected in parallel to the voltage-division power storage elements 5A, 5B, and the DC/DC converter 7 which outputs power from the voltage-division power storage elements 5A, 5B to the main circuit control device 3. The control circuitry 8 in the main circuit power feeder device 4 outputs a control command value to the voltage adjustment circuitry 6 in order to control the voltage adjustment circuitry 6. The voltage adjustment circuitry 6 has three or more connection terminals. The voltage adjustment circuitry 6 is connected to two or more voltage-division power storage elements and performs mutual transfer of power among the voltage-division power storage elements in order to adjust voltage balance among the two or more voltage-division power storage elements. The DC/DC converter 7 receives an input from at least one voltage-division power storage element and outputs desired voltage to the main circuit control device 3. Since the voltage adjustment circuitry 6 adjusts voltage balance among the two ox more voltage-division power storage elements connected in series as described above, insulation using a transformer is not necessary and the circuit configuration is simplified, so that size reduction can be achieved. In the circuit disclosed in Patent Document 1, a plurality of insulation power supplies are connected in series and a transformer is used in each insulation power supply.

Figure 4:
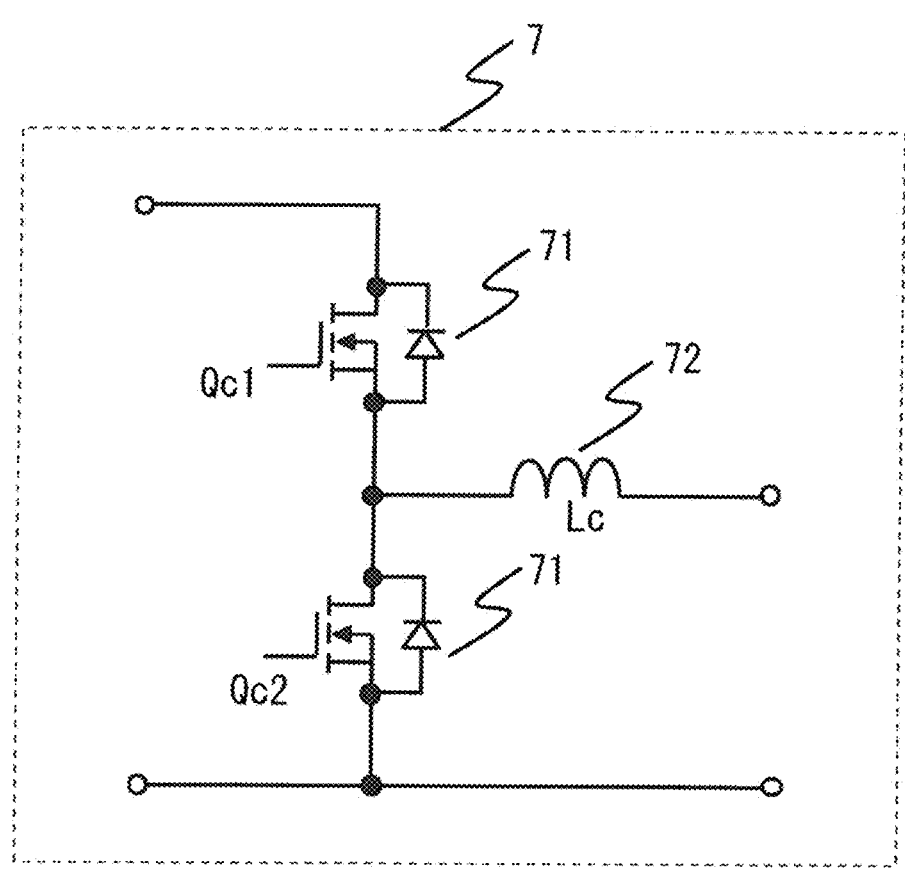
FIG. 4 is a circuit diagram showing an example of a DC/DC converter.
Figure 5:
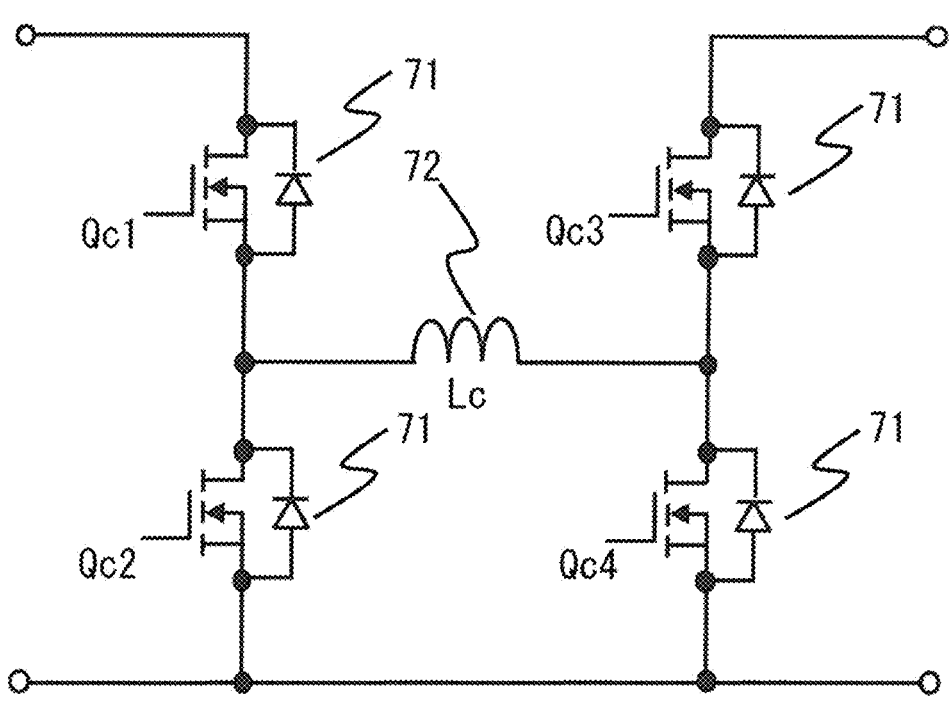
FIG. 5 is a circuit diagram showing an example of a DC/DC converter.

As the DC/DC converter 7, any circuit configuration may be adopted. If insulation between input and output is not required, a chopper configuration may be used, for example. If insulation between input and output is required, a flyback configuration provided with a transformer may be used, for example. In the main circuit power feeding system in the present embodiment, the input and the output have equal potentials. Therefore it is not required to be insulated unless there is a special requirement or reason. Even if insulation is required for some reason, voltage at the input of the DC/DC converter 7 is divided by the voltage-division power storage elements 5A, 5B and the voltage adjustment circuitry 6 as described above, so that the voltage is reduced. Therefore, the voltage difference between the input and the output of the DC/DC converter 7 is smaller than in a case of obtaining an output from voltage of the main circuit power storage element 1 in the same manner as a conventional system. Accordingly, the DC/DC converter 7 has small rated voltage, thus it is able to facilitate size reduction. In general, when the ratio between the input voltage and the output voltage of the DC/DC converter 7 is within a limited range, the step-up/down operation range of the DC/DC converter 7 can be narrowed. Whereby a burden on the DC/DC converter 7 can be reduced. For example, FIG. 4 shows a case in which the DC/DC converter 7 has a chopper configuration and the above ratio is in the step-down operation range. In FIG. 4, two switching elements 71 (Qc1, Qc2) and one reactor 72 (Lc) are provided. FIG. 5 shows a case in which the above ratio is in a range including step-down operation and step-up operation. In FIG. 5, four switching elements 71 (Qc1, Qc2, Qc3, Qc4) and one reactor 72 (Lc) are provided. The circuit configuration shown in FIG. 4 is simpler. A control configuration is more complicated in the case of including both of step-up operation and step-down operation than in the case of including only step-down operation.

In the main circuit power feeder device 4 of the present embodiment, the voltage adjustment circuitry 6 adjusts voltage balance among the two or more voltage-division power storage elements in accordance with a control command value outputted from the control circuitry 8. For example, Patent Document 2 discloses that in a voltage adjustment circuitry for adjusting voltage balance of voltage-division power storage elements connected in series, a control command value is given to the voltage adjustment circuitry so that an ON period and an OFF period of switching elements composing the voltage adjustment circuitry each become 50%. Thus, voltage balance between the two voltage-division power storage elements connected in series is kept such that both voltages are equal at 50%. When the control command value is fixed at a value of 50%, a controller is not complicated, unlike a case in which the control command value is finely adjusted. For example, in a case in which error between a voltage detection value and a target value is calculated in order to adjust the control command value, a combination of an amplifier and an integrator (proportional integral control) or the like is used.

In contrast, in the present embodiment, a control command value is newly set so that voltage of one of the two or more voltage-division power storage elements to which the voltage adjustment circuitry 6 is connected becomes close to zero. Thus, the following operation is performed.

Figure 6:
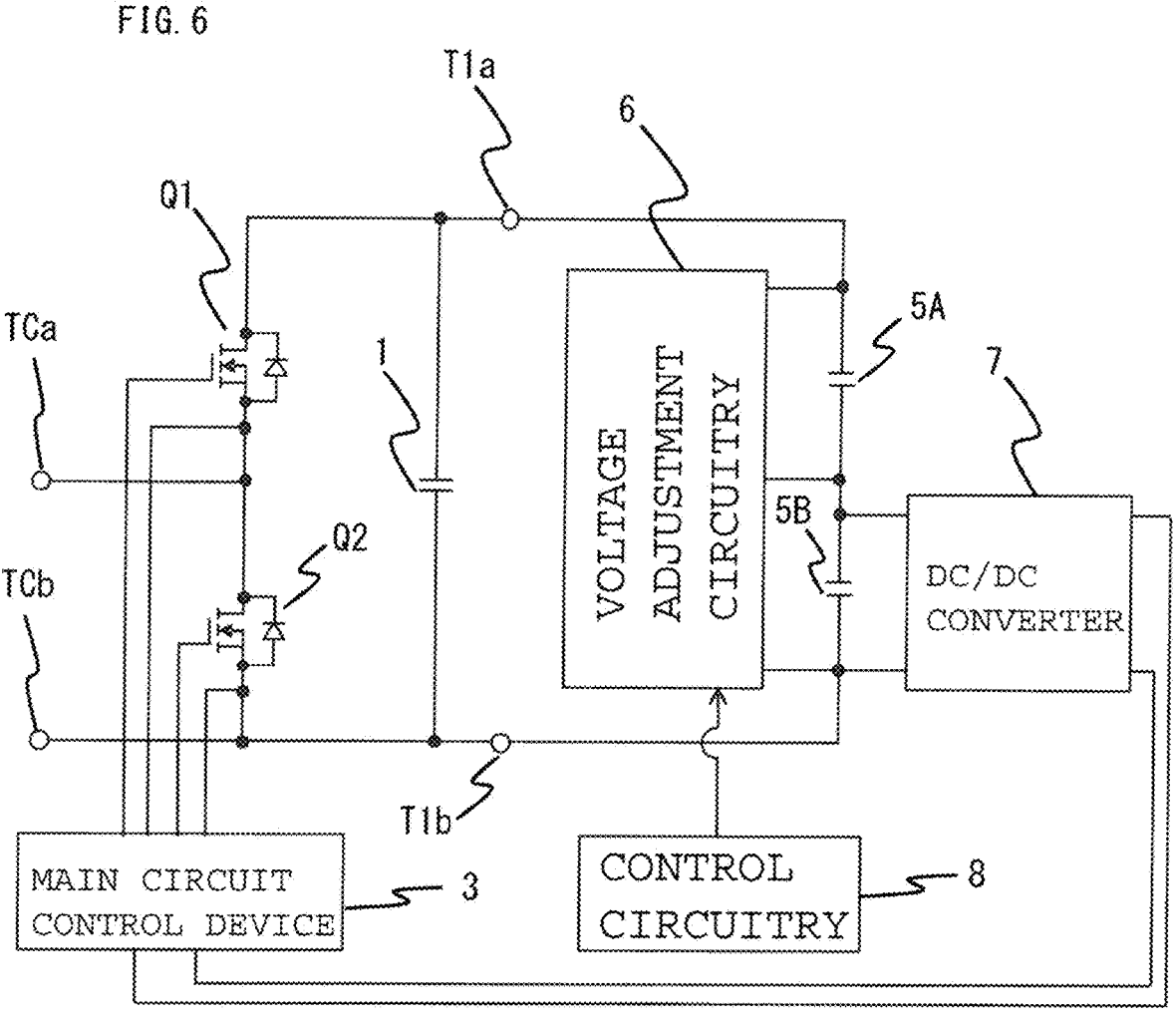
FIG. 6 is a configuration diagram showing the power conversion device according to embodiment 1.

In the main circuit power feeder device 4 shown in FIG. 6, two voltage-division power storage elements 5A, 5B are provided, and voltage of the main circuit power storage element 1 is divided by the two voltage-division power storage elements 5A, 5B. The DC/DC converter 7 is connected to the voltage-division power storage element 5B located on the lower side, of the two voltage-division power storage elements 5A, 5B, and supplies power to the main circuit control device 3. The voltage adjustment circuitry 6 is connected in parallel to the two voltage-division power storage elements 5A, 5B connected in series.

In this configuration, when a control command value at 50% is outputted from the control circuitry 8 to the voltage adjustment circuitry 6, voltages of the two voltage-division power storage elements 5A, 5B are approximately equally divided. Here, in accordance with a factor such as component variations or component loss, voltage imbalance may occur. Next, a control command value at 100% is outputted from the control circuitry 8 to the voltage adjustment circuitry 6. In the control command value at 100%, voltage of the voltage-division power storage element 5A located on the upper side, of the two voltage-division power storage elements 5A, 5B connected in series, becomes zero. And all of voltage of the main circuit power storage element 1 is applied to the voltage-division power storage element. 5B located on the lower side. Therefore, the control command value at 100% is defined as a bypass control command value, That is, the bypass control command value is a control command value for bypassing at least one of the plurality of voltage-division power storage elements.

Since the DC/DC converter 7 is connected so as to supply power from the voltage-division power storage element 5B on the lower side to the main circuit control device 3, input voltage of the DC/DC converter 7 is approximately equal to voltage of the main circuit power storage element 1. On the other hand, as disclosed in Patent Document 2, in a case in which the voltage adjustment circuitry 6 is operated by a control command value at 50%, voltage of the voltage-division power storage element 5B on the lower side becomes approximately 50% of voltage of the main circuit power storage element 1. Therefore, the control command value at 50% is defined as a voltage-division control command value. That is, the voltage-division control command value is a control command value for dividing voltage of the main circuit power storage element 1 among the plurality of voltage-division power storage elements. Here, the reason for describing "approximately 508" is that, to be exact, the value deviates from 50% due to a factor such as component variations, and if there is no variation factor, the value is 50%. Thus, by selecting either 50% (voltage-division control command value) or 100% (bypass control command value) as the control command value, input voltage of the DC/DC converter 7 can be made to be 50% or 100% of voltage of the main circuit power storage element 1.

In a case in which voltage of the main circuit power storage element 1 greatly varies, when voltage of the main circuit power storage element 1 is high, 50% (voltage-division control command value) is selected as the control command value, and when voltage of the main circuit power storage element 1 is low, 100% (bypass control command value) is selected as the control command value. Whereby a variation range of input voltage to the DC/DC converter 7 can be reduced. Alternatively, when voltage of the main circuit power storage element 1 varies, divided voltages of the voltage-division power storage elements 5A, 5B also vary accordingly. Therefore the control command value may be selected in accordance with voltage of one or more of the voltage-division power storage elements. In order to select the control command value from two kinds (50% (voltage-division control command value) and 100% (bypass control command value)) in accordance with voltage of the main circuit power storage element 1 as described above, it is necessary to detect or estimate the voltage value of the main circuit power storage element 1.

Figure 7:
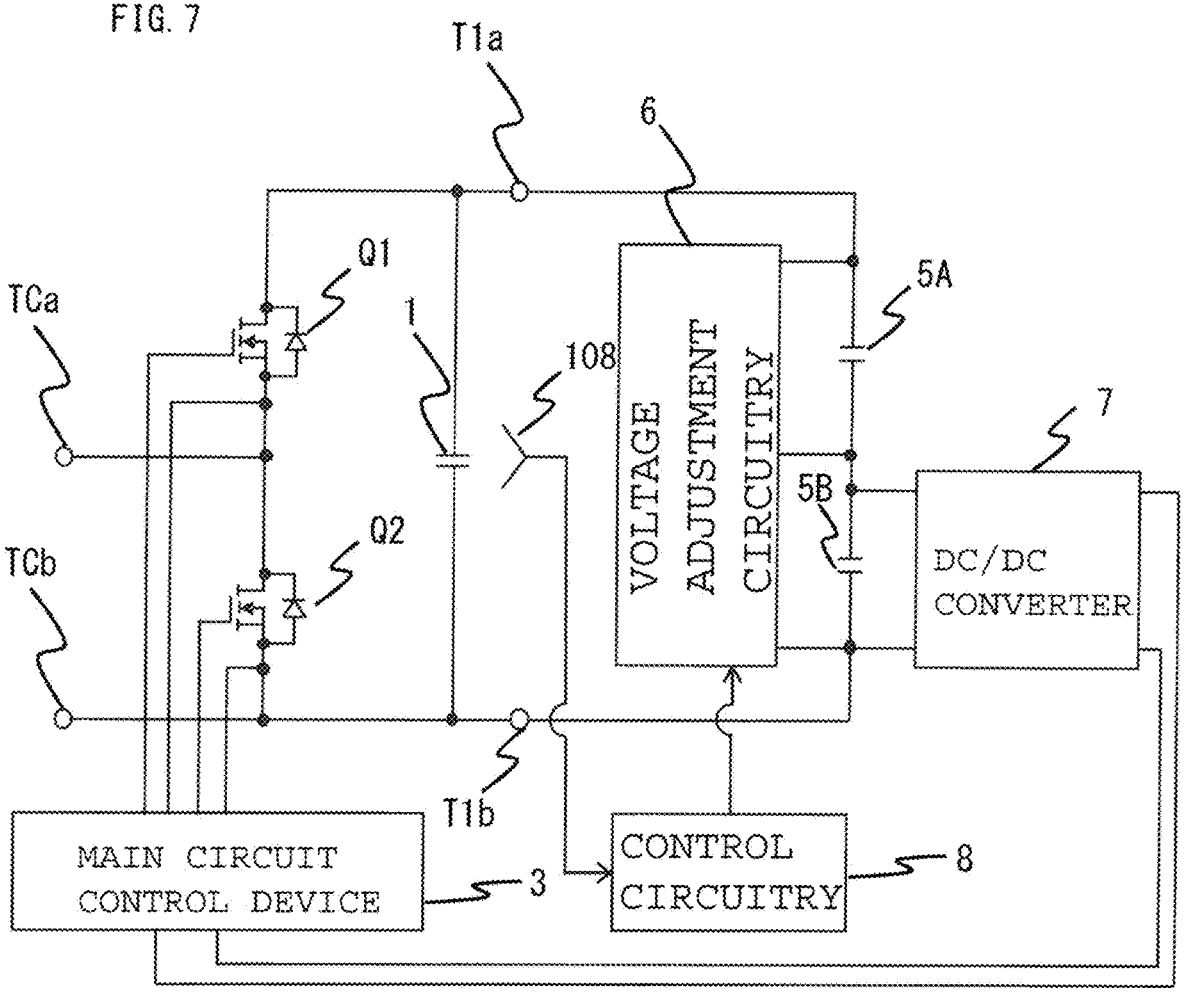
FIG. 7 is a configuration diagram showing the power conversion device according to embodiment 1.

As an estimation method, while voltage of the main circuit power storage element 1 is controlled by the main circuit control device 3, a voltage target value for the main circuit power storage element 1, which is internal information of the main circuit control device 3, may be sent to the control circuitry 8 by means such as communication. As a detection method, a detected value may be sent from the main circuit control device 3 by means such as communication, as with the voltage target valve. Alternatively, the voltage may be detected by the control circuitry 8 of the main circuit power feeder device 4. In the latter method, as shown in FIG. 7, a voltage detector 108 for detecting voltage of the main circuit power storage element 1 is connected to the control circuitry 8. As a method for detecting the voltage, the voltage may be divided by a resistor having a large resistance value and the divided voltage may be detected by an isolation amplifier, a voltage sensor, or the like. However, another method may be used.

In the above description, as shown in FIG. 6, the main circuit power feeder device 4 having two voltage-division power storage elements 5A, 5B has been described. Next, the main circuit power feeder device 4 having three or more voltage-division power storage elements will be described.

Figure 8:
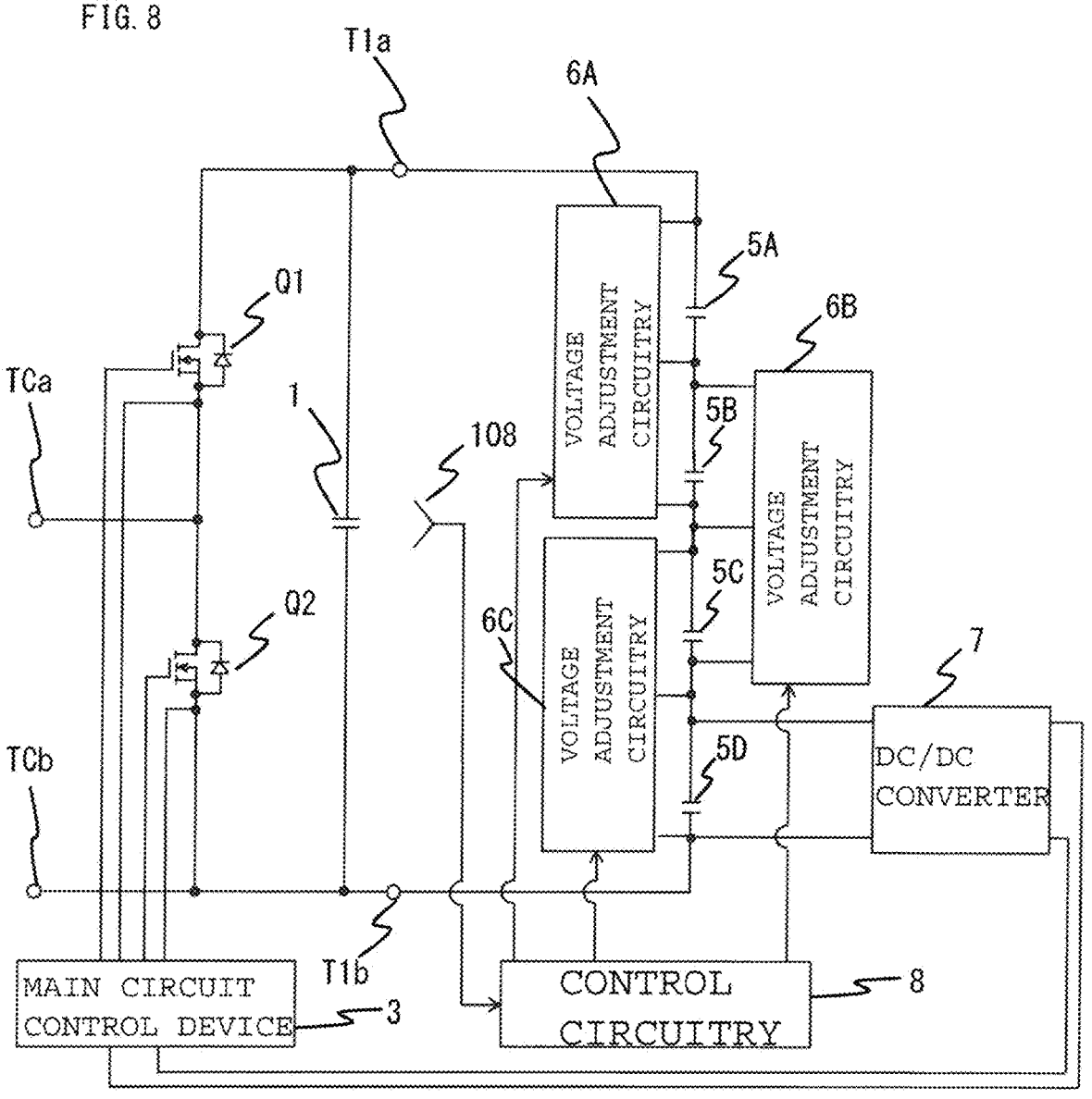
FIG. 8 is a configuration diagram showing the power conversion device according to embodiment 1.

FIG. 8 is a configuration diagram of a power conversion device including a main circuit power feeder device having four voltage-division power storage elements. The four voltage-division power storage elements are denoted by 5A, 5B, 5C, 5D in the order from the highest-potential side (upper side). The DC/DC converter 7 is connected in parallel to one or more of the four voltage-division power storage elements 5A, 5B, 5C, 5D. Here, the DC/DC converter 7 is connected in parallel to the voltage-division power storage element 5D at the lowermost stage in order to supply power to the main circuit control device 3.

A voltage adjustment circuitry 60 is connected in parallel to both of the voltage-division power storage element 5D at the lowermost stage and the voltage-division power storage element 5C adjacent to the voltage-division power storage element 5D at the lowermost stage. Whereby voltage balance between the voltage-division power storage element 5C and the voltage-division power storage element 5D is adjusted. A voltage adjustment circuitry 6B is connected in parallel to both of the voltage-division power storage element 5C and the voltage-division power storage element 5B located on the side opposite to the voltage-division power storage element 5D at the lowermost stage with respect to the voltage-division power storage element 5C. Whereby voltage balance between the voltage-division power storage element 5C and the voltage-division power storage element 5B is adjusted. A voltage adjustment circuitry 6A is connected in parallel to both of the voltage-division power storage element 5B and the voltage-division power storage element 5A. Whereby voltage balance between the voltage-division power storage element 5A and the voltage-division power storage element 5B is adjusted. As described above, the voltage adjustment circuitries 6A, 6B, 60 are connected at staggered stages to the voltage-division power storage elements 5A, 5B, 5C, 5D connected in series. Whereby voltage balance among the voltage-division power storage elements 5A, 5B, 5C, 5D can be adjusted.

The control circuitry 8 outputs a control command value to the voltage adjustment circuitry 6A, 6B, 6C at each stage. In a case of outputting control command values at 50% (voltage-division control command values) to the voltage adjustment circuitries 6A, 6B, 6C at all the stages, voltage of the main circuit power storage element 1 is equally divided by all the voltage-division power storage elements 5A, 5B, 5C, 5D connected in series. By the four voltage-division power storage elements 5A, 5B, 5C, 5D connected in series, voltage of the main circuit power storage element 1 is divided into four in accordance with the control command values at 50% (voltage-division control command values).

Next, in the configuration in which three or more voltage-division power storage elements are connected in series, a case of selecting a control command value at 100% (bypass control command value) will be described. In the same manner as the case of the control command value at 50% (voltage-division control command value), description will be given by using the main circuit power feeder device 4 having the four voltage-division power storage elements 5A, 5B, 5C, 5D shown in FIG. 8. Voltage of one of the two voltage-division power storage elements connected to the voltage adjustment circuitry for which the control command value at 100% (bypass control command value) is selected, becomes zero. In the present embodiment, voltage of the voltage-division power storage element on the upper side (high-voltage side) becomes zero. If voltage of the voltage-division power storage element connected to the input of the DC/DC converter 7 for supplying power from the voltage-division power storage element to the main circuit control device 3 is zero, power cannot be supplied to the main circuit control device 3 via the DC/DC converter 7. Therefore, during normal power supply operation, the control command value for the voltage adjustment circuitry connected to the voltage-division power storage element to which the DC/DC converter 7 is connected is 50% (voltage-division control command value).

As shown in FIG. 8, in a case in which the DC/DC converter 7 is connected to the voltage-division power storage element 5D at the lowermost stage, first, the control command value at 100% (bypass control command value) is selected for the voltage adjustment circuitry 6A connected to the voltage-division power storage element 5A at the uppermost stage located at a connection position farthest from the voltage-division power storage element 5D among the voltage-division power storage elements connected in series. Thereafter, the control command value at 100% (bypass control command value) is selected in the order toward the lowermost stage from the voltage adjustment circuitry 6B connected to the voltage-division power storage element 5B located at a connection position (second stage from the uppermost stage) closest to the voltage-division power storage element 5A at the uppermost stage.

Figure 9:
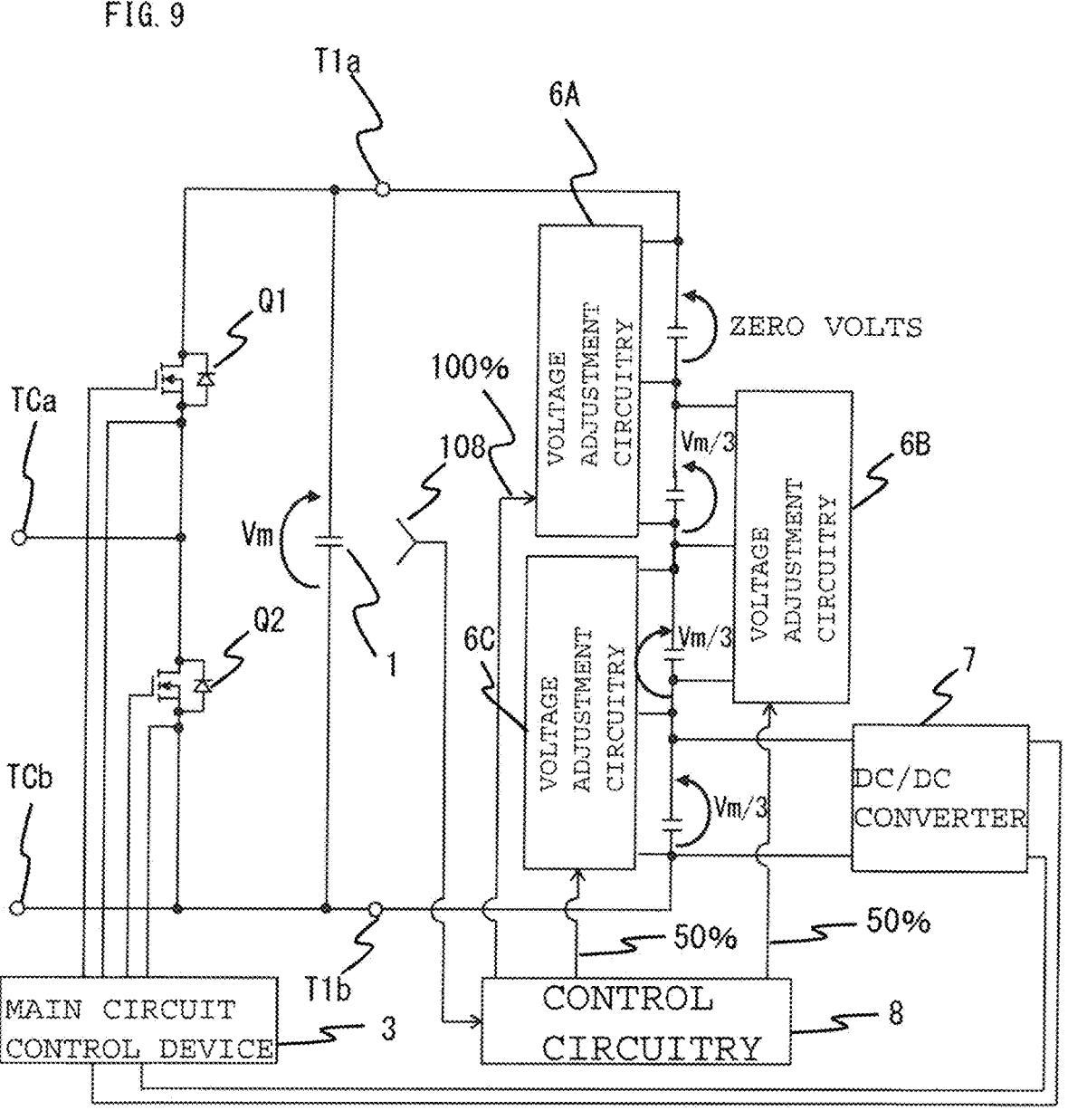
FIG. 9 is a configuration diagram showing the power conversion device according to embodiment 1.

FIG. 9 is a configuration diagram showing operation in a case in which only the control command value given to the voltage adjustment circuitry 6A connected to the voltage-division power storage element 5A at the uppermost stage is 100% (bypass control command value). Main voltage of the main circuit power storage element 1 is denoted by Vm, of the four voltage-division power storage elements 5A, 5B, 5C, 5D, the control command value for the voltage adjustment circuitry 6A connected to the voltage-division power storage element 5A at the uppermost stage and the voltage-division power storage element 5B at the under stage is set at 100% (bypass control command value), so that voltage of the voltage-division power storage element 5A at the uppermost stage becomes zero volts. The control command values for the remaining voltage adjustment circuitries 6B, 6C connected to the voltage-division power storage elements 5B, 5C, 5D are set at 50% (voltage-division control command values). Thus, the main voltage Vm is equally divided by the three voltage-division power storage elements 5B, 5C, 5D, so that each voltage of the voltage-division power storage elements 5B, 5C, 5D becomes Vm/3. The above voltage values are approximate values and actually may slightly deviate to be greater or smaller in accordance with some variation factors.

Figure 10:
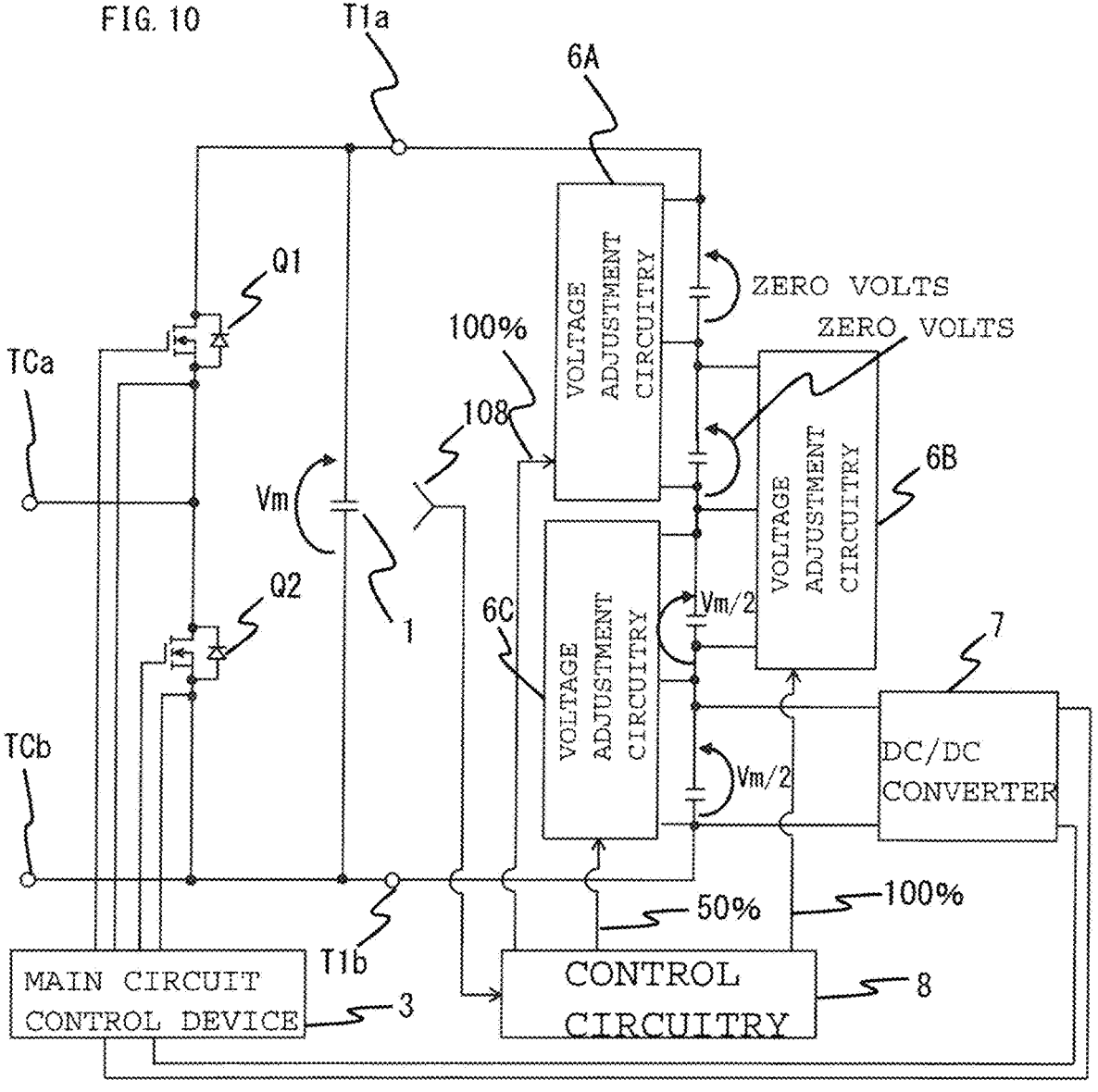
FIG. 10 is a configuration diagram showing the power conversion device according to embodiment 1.

Next, transition toward a state in which voltage of voltage-division power storage element 5B is made so as to be zero volts from the state in which voltage of the voltage-division power storage element 5A at the uppermost stage is zero volts in FIG. 9, will be described. FIG. 10 is a configuration diagram showing operation in which voltages of the voltage-division power storage element 5A at the uppermost stage and the voltage-division power storage element 5B of one-stage lower side of the uppermost stage are made so as to be zero volts. The control command value given to the voltage adjustment circuitry 6A connected to the voltage-division power storage element 5A at the uppermost stage and the voltage-division power storage element 5B of one-stage lower side of the uppermost stage is set at 100% (bypass control command value). The control command value given to the voltage adjustment circuitry 6B connected to the voltage-division power storage element 5B of one-stage lower side of the uppermost stage and the voltage-division power storage element 5C of two-stage lower side of the uppermost stage is set at 100% (bypass control command value). In this case, the voltage adjustment circuitry 6A operates so as to transfer energy of the voltage-division power storage element 5A to the voltage-division power storage element 5B so that voltage of the voltage-division power storage element 5A at the uppermost stage becomes zero volts.

Then, while voltage of the voltage-division power storage element 5B is increased, the voltage adjustment circuitry 6B operates so as to transfer energy of the voltage-division power storage element 5B to the voltage-division power storage element 50 of one-stage lower side of the voltage-division power storage element 5B. Thus, voltage of the voltage-division power storage element 5A at the uppermost stage and voltage of the voltage-division power storage element 5B of one-stage lower side of the uppermost stage become zero volts. Then, the main voltage Vm of the main circuit power storage element 1 is equally divided by the remaining voltage-division power storage elements 5C, 5D, so that the divided voltage values of the voltage-division power storage elements 5C, 5D become Vm/2.

Figure 11:
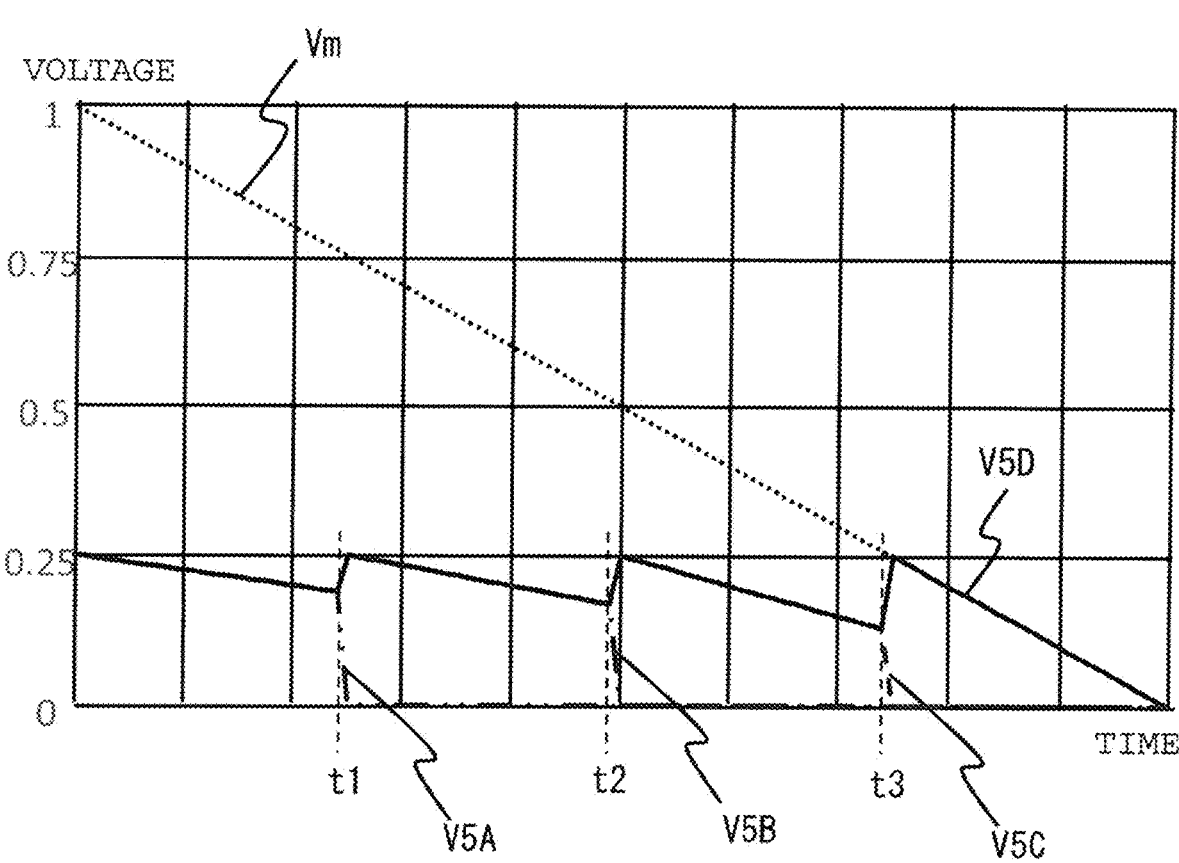
FIG. 11 shows an operation waveform in the power conversion device according to embodiment 1.

FIG. 11 shows a record of a waveform example in a case of actual operation of selecting the control command values as described above in the main circuit power feeder device 4 having the four voltage-division power storage elements 5A, 5B, 5C, 5D shown in FIG. 8. The vertical axis indicates voltage and the horizontal axis indicates time. Values on the vertical axis, which are small values, are exemplary values, and match the actual result, considering that these values are indicated as magnification relative to a reference value. In FIG. 11, the main voltage of the main circuit power storage element 1 is indicated by a dotted line as Vm. Voltage of the voltage-division power storage element 5A is indicated by a two-dot chain line as V5A. Voltage of the voltage-division power storage element 5B is indicated by a chain line as V5B. Voltage of the voltage-division power storage element 5C is indicated by a broken line as V5C. Voltage of the voltage-division power storage element 5D is indicated by a solid line as V5D.

The control circuitry 8 selects 100% (bypass control command value) or 50% (voltage-division control command value) as the control command value for each stage so that voltage of each voltage-division power storage element 5A, 5B, 5C, 5D does not exceed 0.25, whereby the waveform in FIG. 11 is generated. In FIG. 11, from time t1, the voltage V5A of the voltage-division power storage element 5A sharply decreases (two-dot chain line), and the control command value for the voltage adjustment circuitry 6A connected to the voltage-division power storage element 5A becomes 100% (bypass control command value) at time t1. At this time, i.e., during a period when the voltage V5A sharply decreases from time t1 until the voltage reaches zero, the ratios of the divided voltages of the main voltage Vm of the main circuit power storage element 1 increase in the voltages V5B, V5C, V5D, so that the voltages V5B, V5C, V5D increase.

Similarly, from time t2, the voltage V5B of the voltage-division power storage element 5B sharply decreases, and the control command value for the voltage adjustment circuitry 6B connected to the voltage-division power storage element 5B becomes 100% (bypass control command value) at time t2. Similarly, from time t3, the voltage V5C of the voltage-division power storage element 5C sharply decreases, and the control command value for the voltage adjustment circuitry 6C connected to the voltage-division power storage element 5C becomes 100% (bypass control command value) at time t3.

Figure 12:
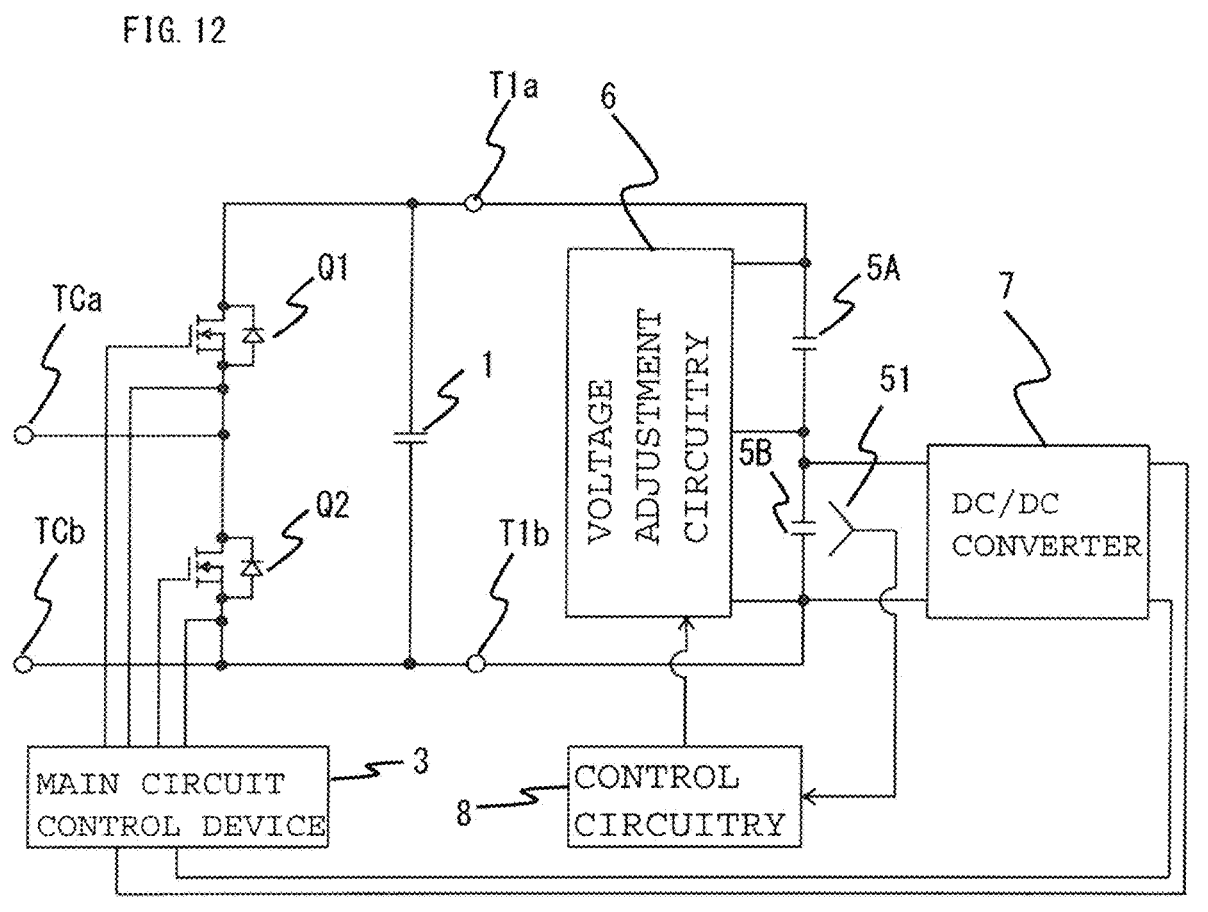
Figure 13:
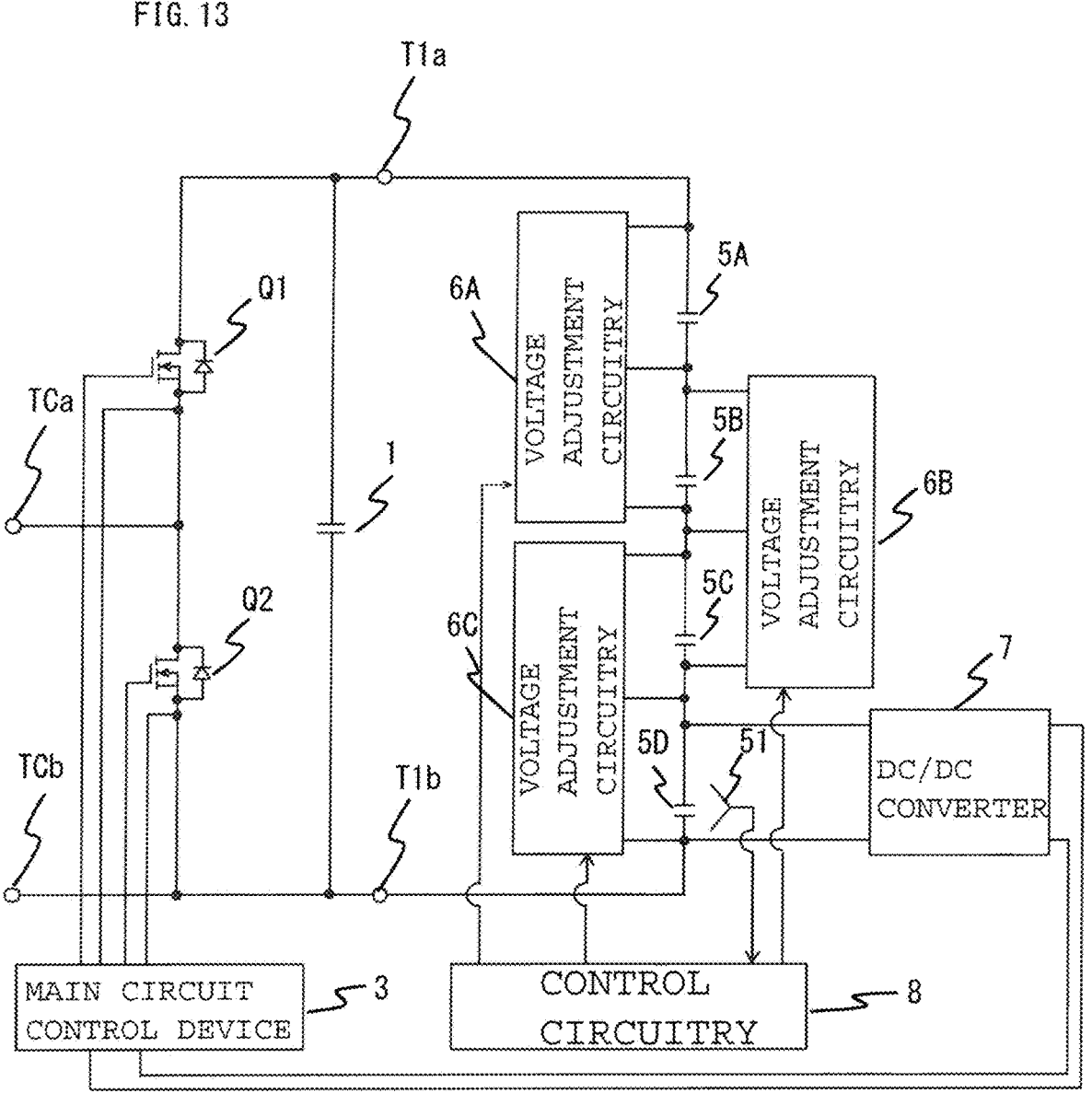
FIG. 13 is a configuration diagram showing the power conversion device according to embodiment 1.

A logic for selecting the control command values in the control circuitry 8 may be any logic. As an example, the main voltage Vm is detected, and by using circuit configuration information such as the number of the provided voltage-division power storage elements or the number of the provided voltage adjustment circuitries 6, the main voltage Vm is divided or multiplied by circuit configuration information based on the above provision number. Whereby voltage of each voltage-division power storage element is estimated. That is, voltage of the voltage-division power storage element 5 can be estimated by dividing the main voltage Vm by the number of stages of capacitors connected in series. The circuit configuration information may be any information that specifies the number of stages of capacitors connected in series. As another example, there is a method using voltage of the voltage-division power storage element, e.g., voltage of the voltage-division power storage element connected to the DC/DC converter 7. In the second logic example, the circuit configuration information is not required or is decreased. FIG. 12 and FIG. 13 are configuration diagrams in a case of using voltage of the voltage-division power storage element. In FIG. 12 and FIG. 13, voltage of the voltage-division power storage element is detected by a voltage detector 51 and is inputted to the control circuitry 8.

As described above, in embodiment 1, insulation is not required for the voltage-division power storage elements 5A, 5B and the voltage adjustment circuitry 6, and thus size reduction can be achieved. Also, insulation is basically not required for the DC/DC converter 7 on the output side, and even if insulation is required, the voltage difference between input and output is small and therefore size reduction can be achieved. Further, since fixed values in two patterns are sufficient for the control command value for the voltage adjustment circuitry 6, an effect that the control configuration is simplified can be obtained.

Embodiment 2

Figure 14:
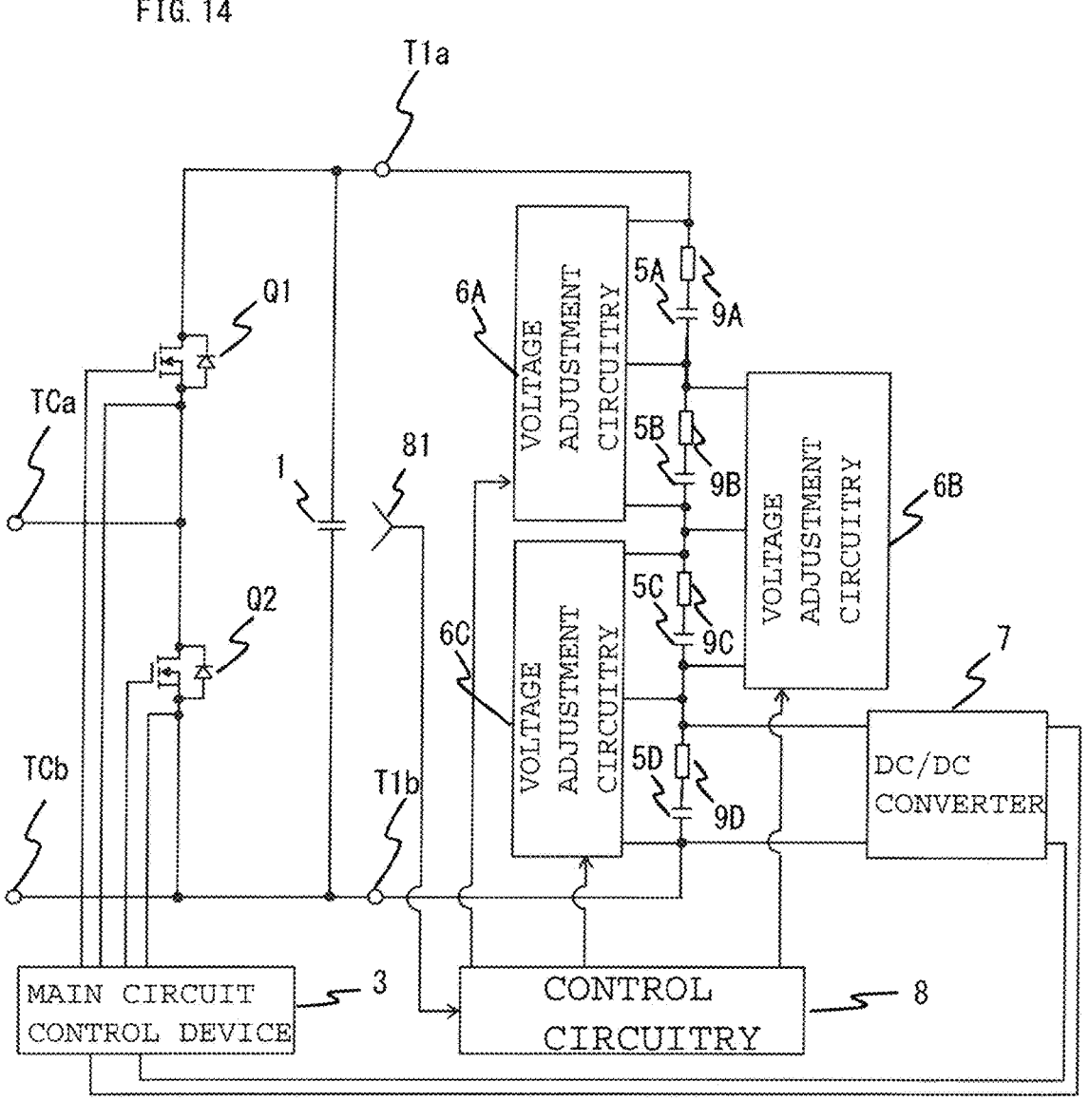
FIG. 14 is a configuration diagram showing a power conversion device according to embodiment 2.

FIG. 14 is a configuration diagram showing a power conversion device according to embodiment 2. An object of the present embodiment is to increase stability of operation of the main circuit power feeder device 4. In FIG. 14, resistance components 9A, 9B, 9C, 9D are added in series to the voltage-division power storage elements 5A, 5B, 5C, 5D in the main circuit power feeder device 4. The resistance components 9A, 9B, 9C, 9D are resistors, wire resistances, or high-frequency resistance elements using a magnetic material such as ferrite, for example. The main circuit power feeder device 4 or the voltage adjustment circuitry 6 shown in embodiment 1 has a wire or a current-limitation reactor, and therefore includes an inductance component. The voltage-division power storage element 5 includes a capacitance because of its role.

Figure 15:
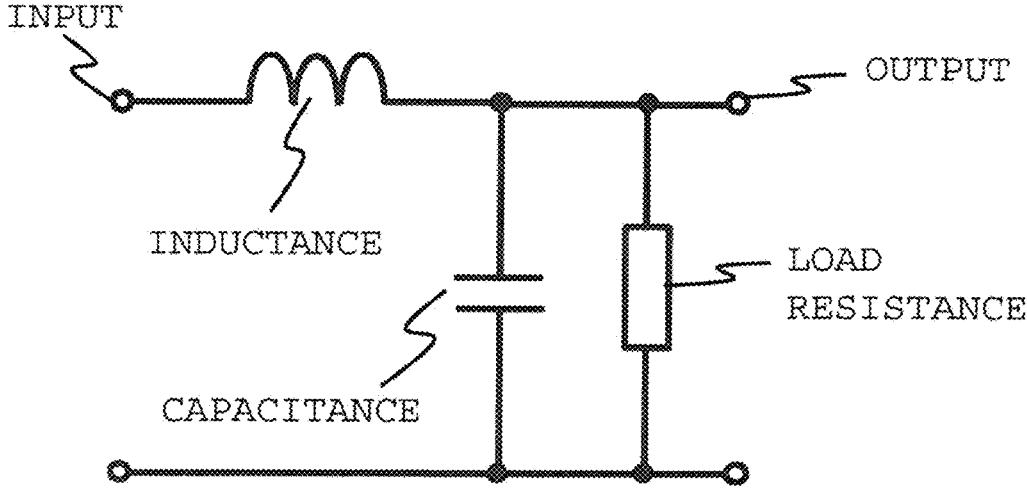
FIG. 15 is a circuit diagram showing a circuit including an inductance, a capacitance, and a load resistance.

Since power is supplied to the main circuit control device 3, the main circuit control device 3 serves as a load for the main circuit power feeder device 4, and thus power supplied to the main circuit control device 3 can be simply regarded as a resistance component. In particular, power consumption in the main circuit control device 3 is, generally, mainly occupied by power for driving the main circuit switching elements Q1, Q2, and since the driving power is almost constant during steady switching operation, the power consumption can be simply regarded as power consumption due to the resistance component. Therefore, power to the main circuit control device 3 side, the voltage adjustment circuitry 6, and the voltage-division power storage element in a part of the main circuit power feeder device 4 can be replaced with a circuit formed by an inductance, a capacitance, and a load resistance. FIG. 15 shows the circuit formed by the inductance, the capacitance, and the load resistance. The resistance components 9A, 9B, 90, 9D connected in series to the voltage-division power storage elements 5 shown in FIG. 14 are not shown in FIG. 15.

An ON period of a switching element 61 (see FIG. 19; the configuration of the voltage adjustment circuitry 6 will be described in detail in embodiment 3) of the voltage adjustment circuitry 6 can be expressed by state averaging method or the like (the details thereof are omitted). In FIG. 15, the inductance is connected in series to a parallel circuit of the load resistance and the capacitance, and the capacitance and the inductance form a series circuit. Further, when the main circuit power feeder device 4 has voltage-division power storage elements and voltage adjustment circuitries at multiple stages, series circuits of capacitances and inductances are formed at multiple stages in the circuit in FIG. 15.

Figure 16:
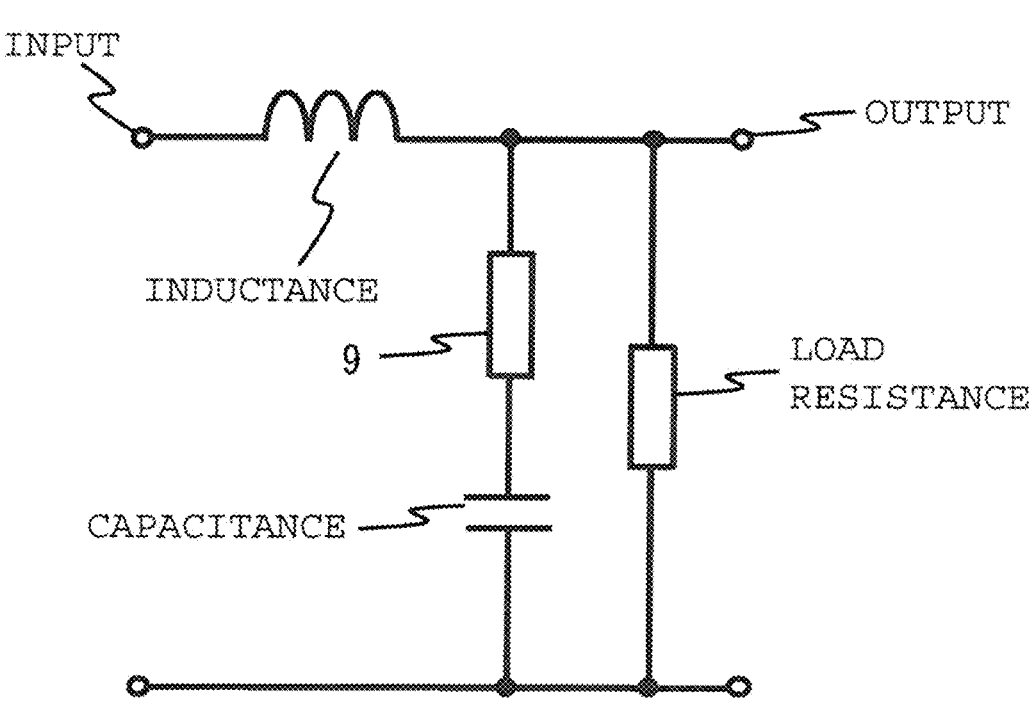
FIG. 16 is a circuit diagram showing a circuit including an inductance, a capacitance, and a load resistance, with a resistance component connected in series to the capacitance.

The series circuit of the capacitance (capacitor) and the inductance (coil) forms a resonant circuit, so that voltage (current) resonates. To apply control for suppressing resonance (e.g., damping control), a digital circuit such as a microcomputer or a digital signal processor, or an analog circuit such as an analog divider or an analog amplifier, is used in the control circuitry 8. In the main circuit power feeder device 4 according to the present embodiment, one of its purposes is to decrease the number of components by simplifying the configuration of the control circuitry 8, and therefore the damping control by the digital circuit or the analog circuit contradicts the purpose and leads to increase in the number of components. Accordingly, as shown in FIG. 16, the circuit is formed by the inductance, the capacitance, and the load resistance, with the resistance component 9 connected in series to the voltage-division power storage element (capacitance). The resistance component 9 is added in series to the capacitance. The resistance component 9 serves as a damping element, thus resonance is suppressed. Therefore, it is not necessary to apply the damping control by using the digital circuit or the analog circuit. As described above, in the present embodiment, the resistance components 9A, 9B, 9C, 9D are added in series to the voltage-division power storage elements 5A, 5B, 5C, 5D, whereby it becomes unnecessary to implement damping control in the control circuitry 8. Further the number of components can be decreased, and operation can be stabilized.

In the main circuit power feeder device 4, since the resistance components 9A, 9B, 9C, 9D are added, loss occurring in the resistance components 9A, 9B, 9C, 9D is also added, so that there might be concern about reduction in conversion efficiency of the main circuit power feeder device 4. Here, the conversion efficiency is represented as output power÷input power×100%, and can be rewritten as (input power−loss)÷input power×100%. In the main circuit power feeder device 4 for supplying control power from the main circuit power storage element 1 to the main circuit control device 3, power from the main circuit power storage element 1 to the main circuit power feeder device 4 is input power. Power from the main circuit power feeder device 4 to the main circuit control device 3 is output power.

In this regard, in the present embodiment, since the resistance components 9A, 9B, 9C, 9D are connected in series to the voltage-division power storage elements 5A, 5B, 5C, 5D, concern about reduction in the conversion efficiency can be eliminated or reduced for a reason described below. That is, in the main circuit control device 3 supplied with power from the main circuit power feeder device 4, power for driving the main circuit switching elements Q1, Q2 is mainly supplied and the power is approximately constant. Therefore, power supplied from the main circuit power feeder device 4 is approximately DC power and flowing current is DC current. Impedance components included in the main circuit power feeder device 4 are roughly classified into capacitances of the voltage-division power storage elements 5A, 5B, 5C, 5D and inductances included in the voltage adjustment circuitries 6 except for the resistance components 9A, 9B, 9C, 9D, and the DC current passes through the inductances.

Meanwhile, ripple (AC current) caused due to switching operations of the switching elements 61, 71 (see FIG. 4 and FIG. 5) or at the time of power variation passes through the voltage-division power storage elements 5A, 5B, 5C, 5D. Therefore, when the resistance components 9A, 9B, 9C, 9D are connected in series to the voltage-division power storage elements 5A, 5B, 5C, 50, the ripple (AC current) also passes through the resistance components 9A, 9B, 9C, 9D, so that loss occurs in the resistance components 9A, 9B, 9C, 9D. This is because the impedance $(1/j\omega C)$ of the capacitance is inversely proportional to the frequency and the impedance $(j\omega L)$ of the inductance is proportional to the frequency. Here, j is an imaginary unit, $\omega$ is an angular frequency, C is the capacitance, and L is the inductance.

Regarding power variation, as described above, power of the main circuit control device 3 is power for driving the main circuit switching elements Q1, Q2 and is normally constant, so that the frequency at which power variation occurs is small. Therefore, the frequency at which ripple (AC current) caused due to switching operations of the switching elements 61, 71 or at the time of power variation passes through the resistance components 9A, 9B, 9C, 9D and loss occurs in the resistance components 9A, 9B, 9C, 9D, is also small. Thus, if the frequency at which loss due to the resistance components 9A, 9B, 9C, 9D occurs is small, the influence on the conversion efficiency due to the resistance components 9A, 9B, 9C, 9D is small.

Figure 17:
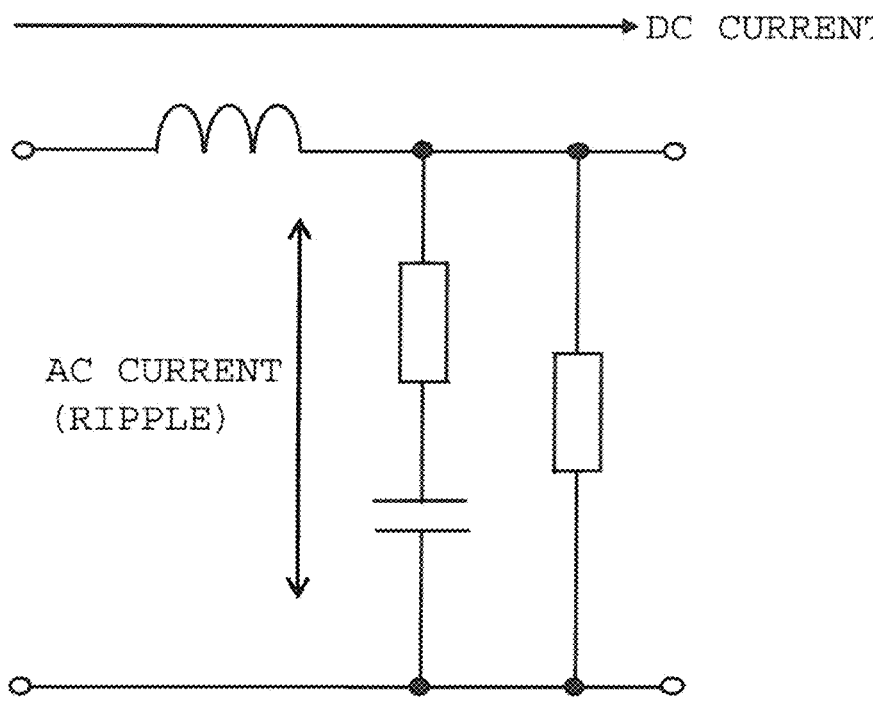
FIG. 17 is a circuit diagram showing the circuit including the inductance, the capacitance, and the load resistance, with the resistance component connected in series to the capacitance.
Figure 18:
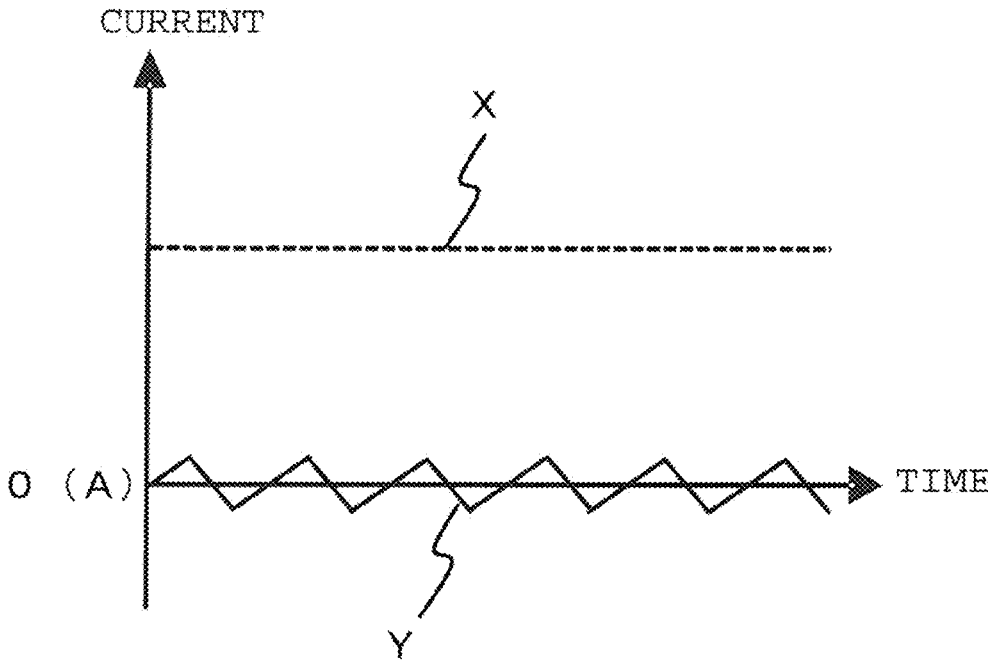
FIG. 18 shows a magnitude relationship between DC current and AC current (ripple).

Ripple due to switching operations of the switching elements 61, 71 always occurs during operation of the main circuit power feeder device 4. However, if the inductance value of the voltage adjustment circuitry 6 is set appropriately (set at a sufficiently large value), the amplitude of voltage can be reduced. Alternatively, since the amplitude of voltage is proportional to the current conduction time, setting the switching frequency at a high value can also reduce the amplitude of voltage. As a result, as shown in FIG. 17 and FIG. 18, the magnitude of AC current (ripple) indicated by a solid line Y can be made sufficiently smaller than the magnitude of DC current indicated by a dotted line X. If the resistance component is connected in series to the inductance, loss due to DC current occurs. When the resistance components 9A, 9B, 9C, 9D are connected in series to the voltage-division power storage elements 5A, 5B, 5C, 5D, loss due to AC current occurs. Since the magnitude of the AC current can be set arbitrarily unlike the DC current, loss due to the AC current can be reduced. Thus, in the main circuit power feeder device 4 according to the present embodiment, concern about reduction in the conversion efficiency due to the resistance components 9A, 9B, 9C, 9D can be eliminated or reduced, so that stability of operation of the main circuit power feeder device 4 can be increased.

Embodiment 3

Figure 19:
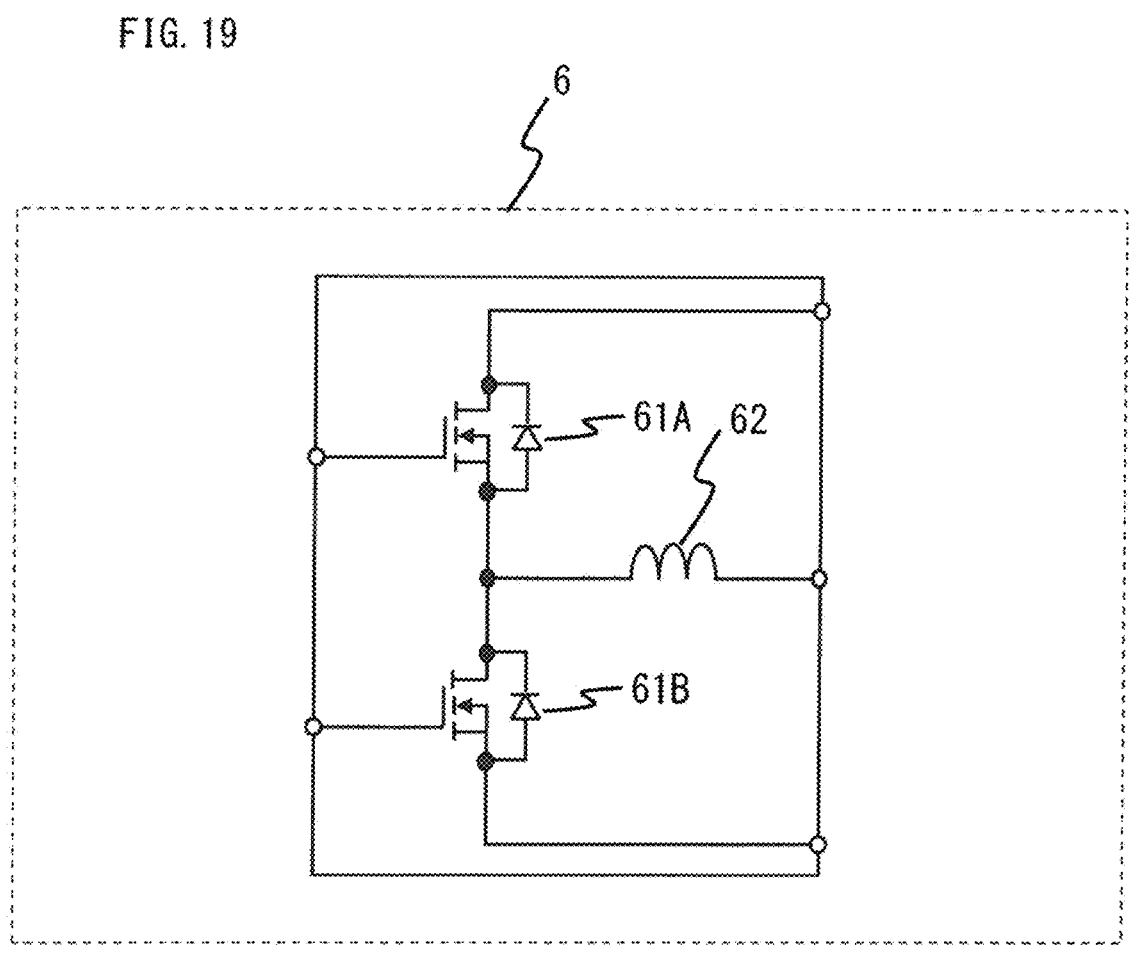
FIG. 19 is a circuit diagram showing a voltage adjustment circuitry in a power conversion device according to embodiment 3.

In the present embodiment, the configuration of the voltage adjustment circuitry 6 will be described. FIG. 19 shows the configuration of the voltage adjustment circuitry which is connected in parallel to two adjacent voltage-division power storage elements in order to adjust voltage balance. In FIG. 19, the voltage adjustment circuitry 6 is composed of a half-bridge circuit in which two switching elements 61A, 61B are connected in series, and a reactor 62 as a current-limitation element connected to an intermediate point of the half-bridge circuit. By selectively turning on and off the two switching elements 61A, 61B, the route of current is changed, whereby voltage balance between the two voltage-division power storage elements is adjusted. Thus, it is possible to provide the main circuit power feeder device 4 that operates without any problem at the time of startup or power variation, by a simple circuit configuration.

Figure 20:
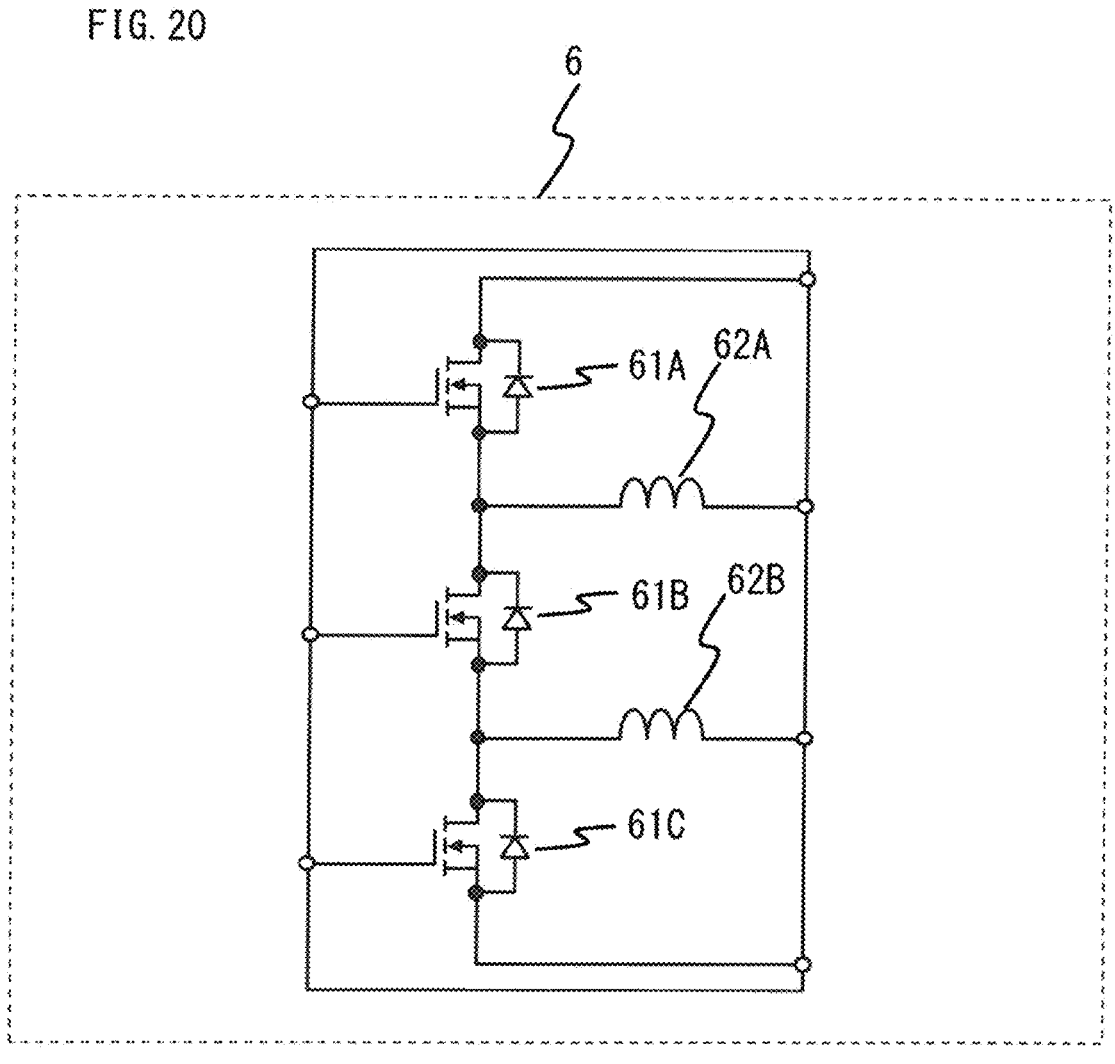
FIG. 20 is a circuit diagram showing a voltage adjustment circuitry in the power conversion device according to embodiment 3.
Figure 21:
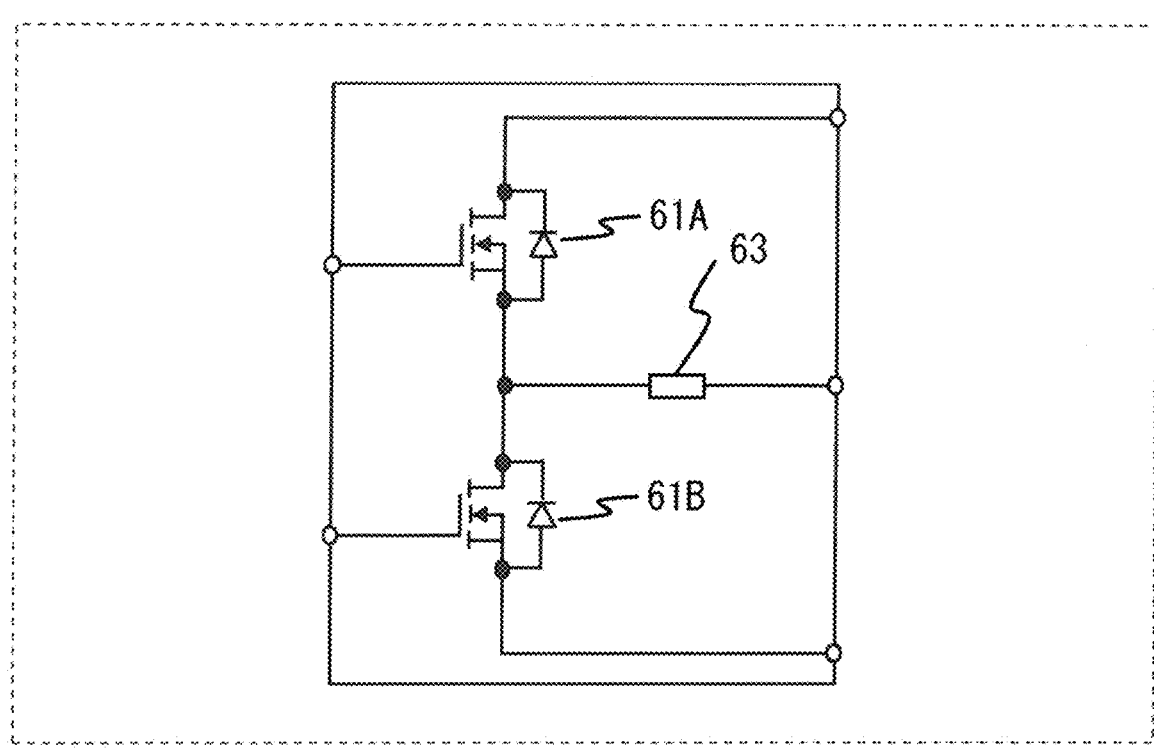
FIG. 21 is a circuit diagram showing a voltage adjustment circuitry in the power conversion device according to embodiment 3.

In FIG. 19, since the voltage adjustment circuitry 6 is connected in parallel to two voltage-division power storage elements, three terminals are provided. FIG. 20 shows the configuration of another voltage adjustment circuitry, and in this case, the voltage adjustment circuitry 6 is connected in parallel to three voltage-division power storage elements. In FIG. 20, the voltage adjustment circuitry 6 includes three switching elements 61A, 61B, 61C connected in series, two reactors 62A, 62B connected between the switching elements 61A, 61B, 61C, and four terminals. As a current-limitation element, a reactor is often used, but as shown in FIG. 21, a resistor 63 may be used as a current-limitation element. In this case, the slope of current is limited by the wiring inductance, the parasitic inductance, the switching speeds of the switching elements 61, and the like, but there is no limitation by the inductance of a reactor as a current-limitation element, and therefore the amplitude of ripple current readily increases. In order to reduce the amplitude of the ripple current, it is necessary to increase the switching frequency. This is because the amplitude of current is proportional to (voltage×time÷inductance).

As shown in FIG. 19, in the half-bridge circuit in which the two switching elements 61A, 61B are connected in series, when the control command value is 100% (bypass control command value), gate voltage (called differently depending on the type of the element, e.g., gate-source voltage, gate emitter voltage, or base-emitter voltage) is given so that the switching element 61A on the upper side is always turned on. Voltage of the voltage-division power storage element connected in parallel to the switching element 61A on the upper side via the current-limitation element 62 becomes zero volts when the switching element 61A on the upper side is always turned ON.

When the control command value is 50% (voltage-division control command value), the switching element 61A on the upper side and the switching element 61B on the lower side are turned on (or off) alternately at a time ratio of 1:1. That is, the two switching elements 61A, 61B are alternately turned on during the same period. Voltages of the two voltage-division power storage elements connected in parallel to the two switching elements 61A, 61B become the same because the switching elements 61A, 61B are turned on during the same period via the current-limitation element 62. However, in a case in which DC current is supplied to the main circuit control device 3 which is a load for the main circuit power feeder device 4, the DC current is superimposed on the current-limitation element 62, so that the above voltages do not become the same. The voltages are also scattered due to component variations.

In this regard, if the rated voltages of components (voltage-division power storage elements or switching elements 61) have some margins, the above voltage difference is allowable. Normally, the rated voltage of a component is set stepwise at 100 V, 300 V, 600 V, 900 V, 1200 V, . . . , and therefore having a margin for the rated voltage does not always mean that the rated voltage of a component is increased by one step. For example, a component having rated voltage of 100 V can cover both of maximum use voltage of 50 V and maximum use voltage of 70 V.

As a method other than having a margin for rated voltage, voltage of the voltage-division power storage element may be detected and the control command value at 50% (voltage-division control command value) may be corrected accordingly, whereby the voltages can be equalized. If such a method that uses correction is adopted, it is required to add a detector such as a voltage sensor, which contradicts decrease in the number of components. In the half-bridge circuit, a dead time during which the two switching elements 61A, 61B are turned off at the same time is provided so that the upper and lower switching elements 61A, 61B are prevented from being turned on at the same time to cause short-circuit. In the main circuit power feeder device 4 in the present embodiment, a dead time is actually provided. But the dead time is regarded as being absent in description because there is no influence on description of the embodiment. As described above, the voltage adjustment circuitry 6 in the present embodiment is formed by a circuit composed of two or more switching elements and one or more current-limitation elements. Thus, it is possible to adjust voltages of the voltage-division power storage elements by only control command values in approximately two patterns, whereby the configuration of the power conversion device can be simplified.

Embodiment 4

Figure 22:
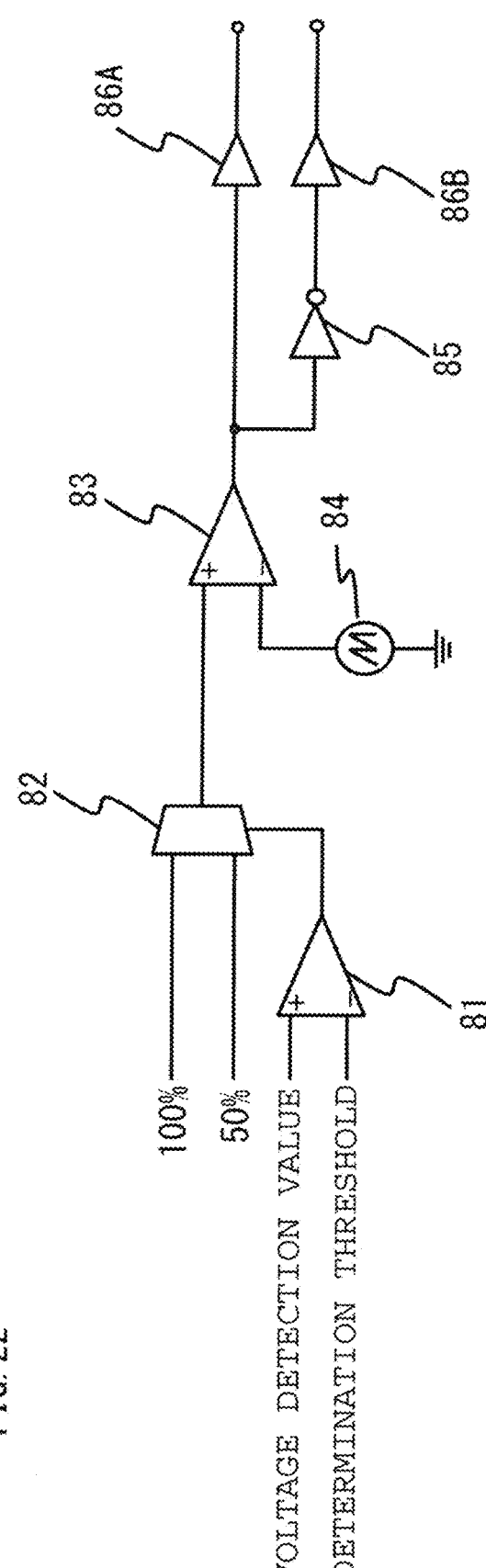
FIG. 22 is a configuration diagram showing a control circuitry in a power conversion device according to embodiment 4.

In the present embodiment, the control circuitry 8 of the main circuit power feeder device 4 will be described. In the control circuitry 8, a control command value is selected and driving signals (gate voltages) for the switching elements 61 are generated. FIG. 22 is a block configuration diagram showing the control circuitry. One of the control command value at 100% (bypass control command value) and the control command value at 50% (voltage-division control command value) is selected by a selector 82. The aforementioned correction value may be superimposed on the control command value. As a selector switching condition, a result of determination for the magnitude relationship between a voltage detection value and a determination threshold, performed by a comparator 81, is used. For example, if the voltage detection value is smaller than the determination threshold, the control command value at 100% (bypass control command value) is selected, and if the voltage detection value is larger than the determination threshold, the control command value at 50% (voltage-division control command value) is selected.

The voltage detection value is main voltage of the main circuit power storage element. 1 of voltage of the voltage-division power storage element 5, and is obtained by the voltage detector 108, 51. The determination threshold is set individually for each voltage adjustment circuitry 6 that is an object of the control command value, and in a case of using voltages of the voltage-division power storage elements 5 as voltage detection values, the determination thresholds may have the same value. The selected one of the control command values is compared with the carrier wave 84 regarding the magnitude relationship by a comparator 83, thus pulse width modulation (PWM) is performed. In a case in which the voltage adjustment circuitry 6 has two switching elements, conversion into signals at two levels of 1 and 0 is performed by PWM. The signals at two levels are branched and one signal is sent to one switching element 61A via a driver 86A. The other signal passes through a NOT circuit (inverter) or an inverting amplification circuit 85 and then is sent to the other switching element 61B via a driver 86B. Thus, the two switching elements 61A, 61B are turned on or off alternately.

Figure 23:
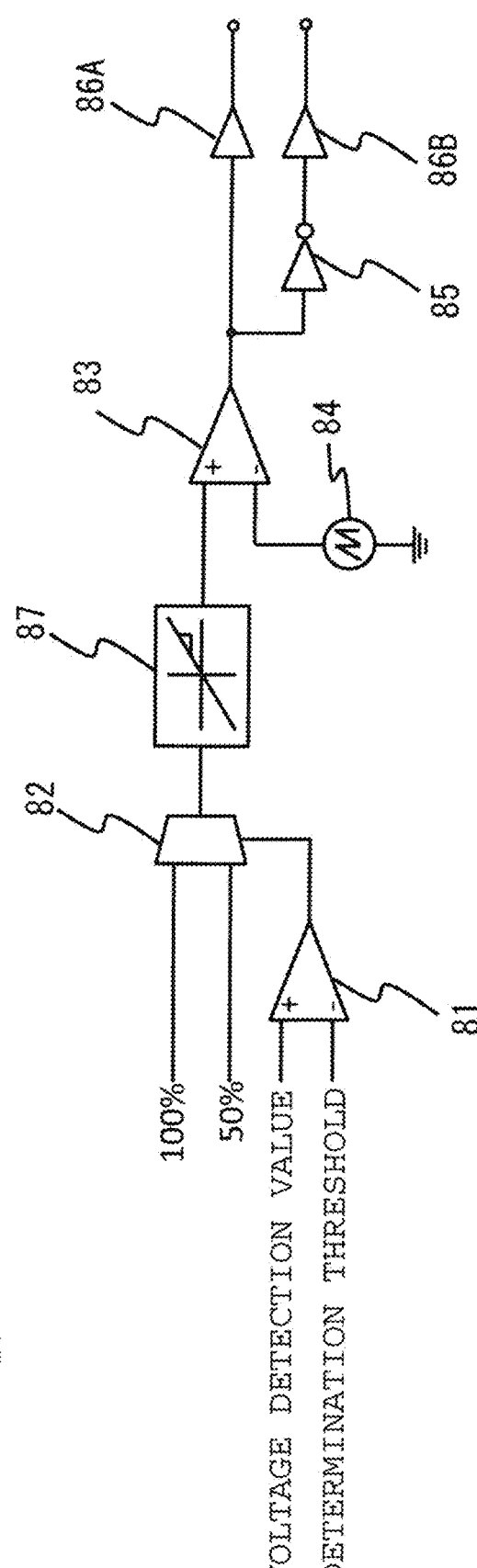
FIG. 23 is a configuration diagram showing a control circuitry in the power conversion device according to embodiment 4.

In FIG. 22, when the control command value is switched as a result of selection by the selector 82, the ON periods of the switching elements 61 sharply change. As a result, voltages and currents at each part in the main circuit power feeder device 4 might sharply change. FIG. 23 is a block configuration diagram showing a control circuitry for avoiding the above phenomenon. As shown in FIG. 23, temporal change of the selected control command value is limited by temporal change limitation means 87. In a case in which a control command value change (dV) of the control command value per certain time (dt) exceeds a limit value (dVmax), the temporal change limitation means 87 outputs such a control command value that the control command value change (dV) of the control command value per certain time (dt) is limited (replaced) by the limit value (dVmax). That is, the temporal change limitation means 87 is called a dV/dt limiter (slope limiter).

The temporal change limitation means 87 as a dV/dt limiter has a function of replacing a step change of the control command value with a gradual change (ramp change).

As described above, the temporal change limitation means 87 is added, whereby sharp changes in voltages and currents at each part in the main circuit power feeder device 4 are suppressed, thus stabilization is achieved.

On the other hand, in a case in which a correction value is superimposed on the control command value by feedback control, temporal change limitation by the dV/dt limiter does not act on a minute signal change in the correction value for the control command value based on feedback control, and therefore does not influence response of feedback control. This is because the dV/dt limiter is a so-called limiter and thus, while such a large signal as to exceed the limit value is limited, such a minute signal as not to exceed the limit value is passed without being limited. Therefore, using the dV/dt limiter which is the temporal change limitation means 87 hardly influences feedback control. If the influence on feedback control is considered, means other than the dV/dt limiter which is the temporal change limitation means 87 may be applied. For example, a low-pass filter that obtains desired frequency response may be applied so that temporal change in the control command value becomes mild.

Figure 24:
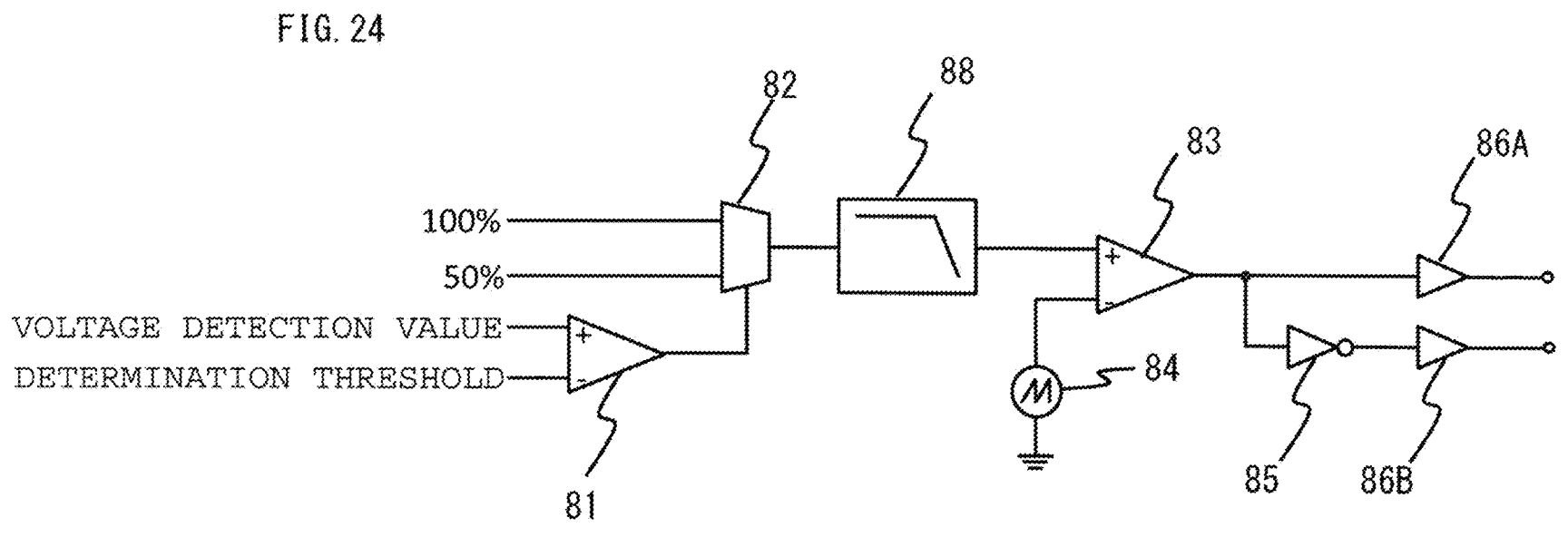

Considering the purpose of decreasing the number of components, a configuration in which the correction value based on feedback control by adding the voltage sensor is not superimposed on the control command value is a superior option. In this case, it is not necessary to take account of the influence on a minute signal change in the correction value for the control command value. Using the low-pass filter can simplify the circuit configuration as compared to the dv/dt limiter. Therefore, the low-pass filter is more suitable for the purpose than the dV/dt limiter. The low-pass filter is formed by a series circuit of a resistor and a capacitor, for example. FIG. 24 is a block configuration diagram showing a control circuitry in a case of using a low-pass filter 88 instead of the temporal change limitation means 87.

Embodiment 5

Figure 25:
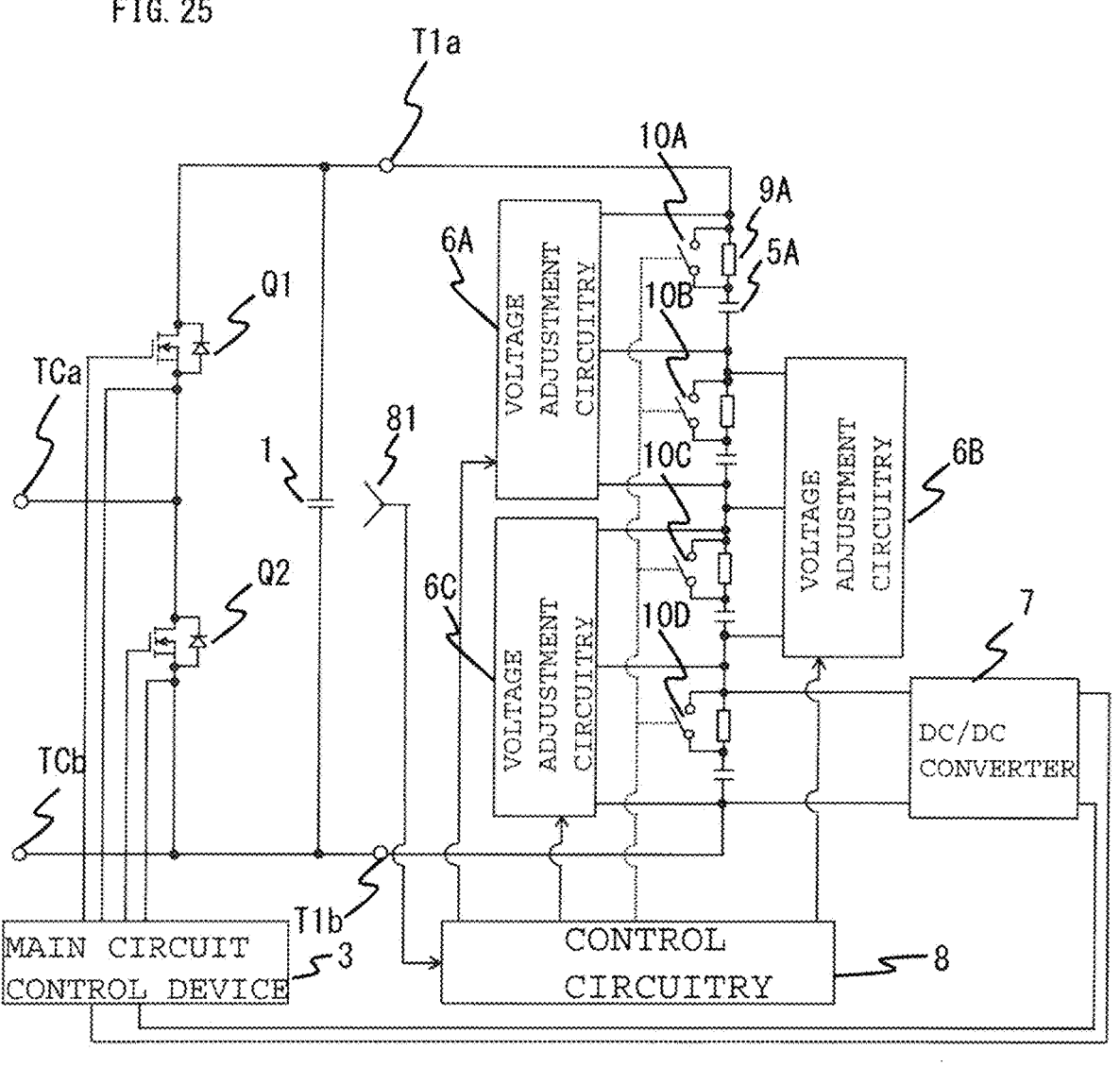
FIG. 25 is a configuration diagram showing a power conversion device according to embodiment 5.

In the present embodiment, a method for further enhancing conversion efficiency of the main circuit power feeder device 4 will be described. FIG. 25 is a configuration diagram showing a power conversion device according to embodiment 5. In the above description, it has been described that the resistance components 9 are connected in series to the voltage-division power storage element 5 in order to suppress resonance due to disturbance. Also, it has been described that the main circuit control device 3 which is a load for the main circuit power feeder device 4 consumes approximately constant power (DC power). Further, it has been described that the voltage adjustment circuitry 6 is basically operated by using control command values in two patterns, i.e., 50% (voltage-division control command value) and 100% (bypass control command value). From the above, disturbance that should be assumed in the main circuit power feeder device 4 is caused by variation in the main voltage of the main circuit power storage element 1 on the input side, rather than the load side.

A case in which the main voltage of the main circuit power storage element 1 varies is the time of startup of the power conversion device. One example of operation at the time of startup of the power conversion device is such a sequence that initial charging is performed until the main voltage becomes steady operation voltage from a zero-volt state and then the operation shifts to steady operation after the main voltage reaches the steady operation voltage. Therefore, it is assumed that a period in which resonance due to disturbance needs to be suppressed in the main circuit power feeder device 4 is only at the time of startup of the power conversion device. In this case, the resistance components 9A, 9B, 9C, 9D connected in series to the voltage-division power storage elements 5A, 5B, 5G, 5D may be short-circuited (bypassed) except at the time of startup of the power conversion device. FIG. 25 shows a power conversion device in which short-circuit means 10A, 108, 10C, 10D for bypassing the resistance components 9A, 93, 9C, 9D are added. The fact that startup of the power conversion device is completed is sensed by any means, e.g., detection of the main voltage of the main circuit power storage element 1. And the short-circuit means 10A, 10B, 10C, 10D for bypassing the resistance components 9A, 9B, 9C, 9D are turned on. Thus, during a period in which the resistance components 9A, 9B, 9C, 9D are bypassed, loss in the entire device can be reduced by an amount corresponding to loss occurring in the resistance components 9A, 9B, 9C, 9D, whereby conversion efficiency can be further enhanced.

Embodiment 6

In the present embodiment, a method for suppressing resonance in the main circuit power feeder device 4 will be described. In the above embodiments 1 to 5, it has been described that the resistance components 9 are connected in series to the voltage-division power storage element 5 in order to suppress resonance due to disturbance. In the present embodiment, resonance is suppressed by changing the gate voltage of the switching element 61 (see FIG. 19 to FIG. 21). Regarding the switching elements 61 such as metal oxide semiconductor field effect transistors (MOSFET) or insulated gate bipolar transistors (IGBT), in the same individual element, when the gate voltage is increased, an ON resistance (ON voltage) between the drain and the source (between the collector and the emitter) is reduced. And conversely, when the gate voltage is reduced, the ON resistance (ON voltage) is increased. Thus, by changing the gate voltage, the same effect as increasing/decreasing a resistance component can be obtained.

Figures 26, 26A, 26B:
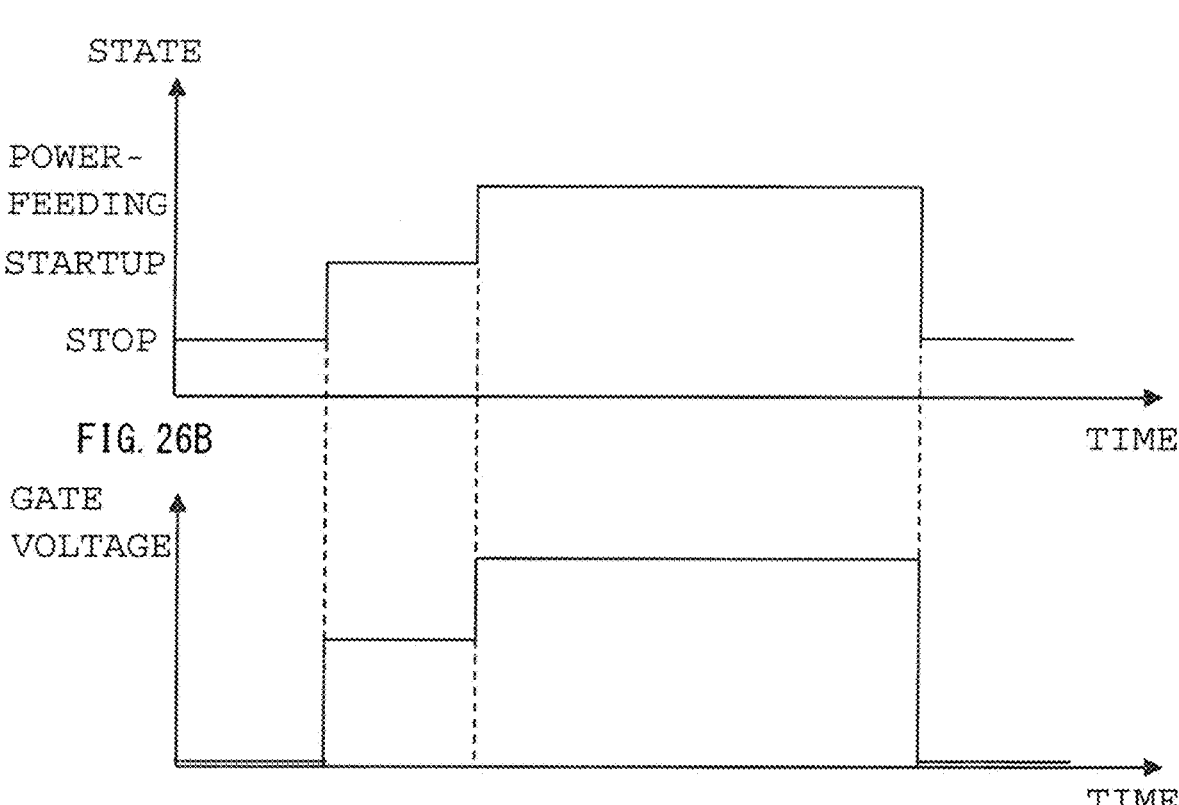
FIG. 26A shows state change in a power conversion device according to embodiment 6.
FIG. 26B shows temporal change in gate voltage applied to a switching element.

In the present embodiment, instead of a method of connecting the resistance component in series to the voltage-division power storage element, a method of changing the gate voltage of the switching element 61 is used. FIG. 26A shows state change in the power conversion device according to embodiment 6, and FIG. 26B shows temporal change in the gate voltage applied to the switching element. As shown in FIG. 26A and FIG. 26B, at the time of startup of the power conversion device, the gate voltages for driving the switching elements 61 of the voltage adjustment circuitry 6 have been reduced, and during a period other than the time of startup of the power conversion device, the gate voltages are returned to a steady value. Thus, it is possible to reduce oscillation of voltages and currents at each part in the main circuit power feeder device 4, without connecting the resistance component in series to the voltage-division power storage element.

Although the disclosure is described above in terms of various exemplary embodiments and implementations, it should be understood that the various features, aspects, and functionality described in one or more of the individual embodiments are not limited in their applicability to the particular embodiment with which they are described, but they can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 main circuit power storage element
2 main circuit
3 main circuit control device
4 main circuit power feeder device
5A to 5D voltage-division power storage element
6A to 6C voltage adjustment circuitry
7 DC/DC converter
8 control circuitry
9A to 9D resistance component
61A to 61C switching element
62, 63 current-limitation
87 slope limiter
9A to 9D resistance component
88 low-pass filter
Q1 to Q4 main circuit switching element
The invention claimed is:
1. A power conversion device comprising:
a main circuit including main circuit switching elements and a main circuit power storage element;
a main circuit controller which controls the main circuit switching elements; and
a main circuit power feeder which supplies control power from the main circuit power storage element to the main circuit controller, wherein
the main circuit power feeder includes
a plurality of voltage-division power storage elements connected in series,
a voltage adjustment circuitry which is connected to the plurality of voltage-division power storage elements and adjusts each of voltages of the plurality of voltage-division power storage elements by mutual transfer of power among the plurality of voltage-division power storage elements,
at least one DC/DC converter which is connected to at least one of the plurality of voltage-division power storage elements and supplies the control power to the main circuit controller, and
a control circuitry which outputs control command values in two patterns that are a voltage-division control command value for dividing voltage of the main circuit power storage element among the plurality of voltage-division power storage elements and a bypass control command value for bypassing at least one of the plurality of voltage-division power storage elements, in order to control the voltage adjustment circuitry, and which adjusts input voltage to the at least one DC/DC converter, wherein the control circuitry selects the control command values in accordance with the voltage of the main circuit power storage element or the voltages of the plurality of voltage-division power storage elements, and the control circuitry estimates the voltages of the voltage-division power storage elements from the voltage of the main circuit power storage element on a basis of a number of provided voltage-division power storage elements or a number of provided voltage adjustment circuitries.

2. The power conversion device according to claim 1, wherein the voltage adjustment circuitry is composed of two or more switching elements and one or more current-limitation elements.

3. The power conversion device according to claim 2, wherein at a time of startup, gate voltages for driving the two or more switching elements of the voltage adjustment circuitry are reduced, and the gate voltages are set at steady values except at the time of startup.

4. The power conversion device according to claim 3, wherein a resistance component is connected in series to each of the plurality of voltage-division power storage elements.

5. The power conversion device according to claim 2, wherein a resistance component is connected in series to each of the plurality of voltage-division power storage elements.

6. The power conversion device according to claim 1, wherein a resistance component is connected in series to each of the plurality of voltage-division power storage elements.

7. The power conversion device according to claim 6, wherein the resistance component connected in series to each of the plurality of voltage-division power storage elements is short-circuited except at a time of startup.

8. The power conversion device according to claim 7, wherein the voltage adjustment circuitry is composed of two or more switching elements and one or more current-limitation elements.

9. The power conversion device according to claim 6, wherein the voltage adjustment circuitry is composed of two or more switching elements and one or more current-limitation elements.

10. A power conversion device comprising:

a main circuit including main circuit switching elements and a main circuit power storage element;

a main circuit controller which controls the main circuit switching elements; and a main circuit power feeder which supplies control power from the main circuit power storage element to the main circuit controller, wherein the main circuit power feeder includes a plurality of voltage-division power storage elements connected in series, a voltage adjustment circuitry which is connected to the plurality of voltage-division power storage elements and adjusts each of voltages of the plurality of voltage-division power storage elements by mutual transfer of power among the plurality of voltage-division power storage elements, at least one DC/DC converter which is connected to at least one of the plurality of voltage-division power storage elements and supplies the control power to the main circuit controller, and a control circuitry which outputs control command values in two patterns that are a voltage-division control command value for dividing voltage of the main circuit power storage element among the plurality of voltage-division power storage elements and a bypass control command value for bypassing at least one of the plurality of voltage-division power storage elements, in order to control the voltage adjustment circuitry, and which adjusts input voltage to the at least one DC/DC converter, wherein the control circuitry limits a temporal change rate of the control command values when performing switching between the control command values in the two patterns.

11. The power conversion device according to claim 10, wherein the limitation of the temporal change rate of the control command values is performed by a slope limiter or a low-pass filter.

12. The power conversion device according to claim 11, wherein the voltage adjustment circuitry is composed of two or more switching elements and one or more current-limitation elements.

13. The power conversion device according to claim 11, wherein a resistance component is connected in series to each of the plurality of voltage-division power storage elements.

14. The power conversion device according to claim 10, wherein the voltage adjustment circuitry is composed of two or more switching elements and one or more current-limitation elements.

15. The power conversion device according to claim 10, wherein a resistance component is connected in series to each of the plurality of voltage-division power storage elements.

16. A main circuit power feeder provided in a power conversion device that includes a main circuit including main circuit switching elements and a main circuit power storage element, and a main circuit controller which controls the main circuit switching elements, the main circuit power feeder being configured to supply control power from the main circuit power storage element to the main circuit controller, the main circuit power feeder comprising:

a plurality of voltage-division power storage elements connected in series;

a voltage adjustment circuitry which is connected to the plurality of voltage-division power storage elements and adjusts each of voltages of the plurality of voltage-division power storage elements by mutual transfer of power among the plurality of voltage-division power storage elements;

at least one DC/DC converter which is connected to at least one of the plurality of voltage-division power storage elements and supplies the control power to the main circuit controller; and a control circuitry which outputs control command values in two patterns that are a voltage-division control command value for dividing voltage of the main circuit power storage element among the plurality of voltage-division power storage elements and a bypass control command value for bypassing at least one of the plurality of voltage-division power storage elements, in order to control the voltage adjustment circuitry, and which adjusts input voltage to the at least one DC/DC converter, wherein the control circuitry limits a temporal change rate of the control command values when performing switching between the control command values in the two patterns.

17. The power conversion device according to claim 16, wherein the limitation of the temporal change rate of the control command values is performed by a slope limiter or a low-pass filter.

18. The power conversion device according to claim 17, wherein a resistance component is connected in series to each of the plurality of voltage-division power storage elements.

19. The power conversion device according to claim 16, wherein the voltage adjustment circuitry is composed of two or more switching elements and one or more current-limitation elements.

20. The power conversion device according to claim 16, wherein a resistance component is connected in series to each of the plurality of voltage-division power storage elements.

* * * * *